US012263560B1

(12) United States Patent
Kukucka et al.

(10) Patent No.: US 12,263,560 B1
(45) Date of Patent: Apr. 1, 2025

(54) ANCHOR AND RELEASE TOOL

(71) Applicant: Grip Holdings LLC, Brandon, FL (US)

(72) Inventors: Paul Kukucka, Brandon, FL (US); Simeon B. Kukucka, Brandon, FL (US); Thomas Kukucka, Brandon, FL (US)

(73) Assignee: Grip Holdings LLC, Brandon, FL (US)

( * ) Notice: Subject to any disclaimer, the term of this patent is extended or adjusted under 35 U.S.C. 154(b) by 0 days.

(21) Appl. No.: 18/823,296

(22) Filed: Sep. 3, 2024

(51) Int. Cl.
*B25B 13/08* (2006.01)
*B25B 13/06* (2006.01)

(52) U.S. Cl.
CPC ............ *B25B 13/08* (2013.01); *B25B 13/065* (2013.01)

(58) Field of Classification Search
CPC ....... B25B 13/06; B25B 13/065; B25B 13/08; B25B 23/08; B25B 23/10
See application file for complete search history.

(56) References Cited

U.S. PATENT DOCUMENTS 3,675,516 A * 7/1972 Knudsen ............... B25B 13/065 81/176.15
4,882,957 A * 11/1989 Wright .................. B25B 13/065 81/121.1
5,012,706 A * 5/1991 Wright .................. B25B 13/065 81/121.1
5,148,726 A * 9/1992 Huebschen ............. B25B 13/00 81/186
5,388,486 A * 2/1995 Ruzicka .................. B25B 13/04 81/124.3
5,860,339 A * 1/1999 Mikic ..................... B25B 13/08 81/186
5,996,449 A * 12/1999 Hsieh ...................... B25B 13/08 81/186
6,009,778 A * 1/2000 Hsieh ...................... B25B 13/08 81/186
6,098,501 A * 8/2000 Sundstrom ............ B25B 13/065 81/186
6,145,414 A * 11/2000 Hsieh ...................... B25B 13/08 81/186
6,155,141 A * 12/2000 Baker ..................... B25B 13/08 81/119
6,240,812 B1 * 6/2001 Baker ..................... B25B 13/08 81/186

(Continued)

*Primary Examiner* — David B. Thomas

(57) ABSTRACT

An anti-slip torque tool that utilizes a pair of teeth designed to virtually eliminate slippage and facilitate torque transfer to a fastener. The tool includes a wrench torque-tool body and at least one engagement element. The wrench torque-tool body includes a plurality of internal sidewalls, an engagement first base, and an engagement second base. The engagement element is laterally integrated into a specific sidewall to provide additional gripping action. To perform this function, each engagement element further includes a first tooth and a second tooth. Both the first tooth and the second tooth are positioned offset from each other, along a sidewall base surface. The first tooth is the anchoring tooth, designed to grip the fastener specifically from off the corner off a male hex fastener. In contrast, the second tooth is the releasing tooth, designed to release the tool from the fastener.

28 Claims, 18 Drawing Sheets

(56) References Cited

U.S. PATENT DOCUMENTS 6,668,686 B1 * 12/2003 Hsien .................... B25B 13/065 81/176.1
6,755,098 B2 * 6/2004 Huang .................... B25B 13/08 81/186
7,107,879 B1 * 9/2006 Cheng ..................... B25B 13/08 81/186
7,168,347 B2 * 1/2007 Hsieh ...................... B25B 27/18 81/120
7,261,020 B2 * 8/2007 Hsieh .................... B25B 13/065 81/186
7,270,032 B1 * 9/2007 Hsieh ...................... B25B 13/04 81/186
7,437,977 B2 * 10/2008 Hsieh .................. B25B 23/0035 81/124.6
7,661,339 B2 * 2/2010 Wu ......................... B25B 27/18 81/186
7,861,621 B2 * 1/2011 Cheng ..................... B25B 13/46 81/121.1
8,359,952 B2 * 1/2013 Hsieh ...................... B25B 13/08 81/186
8,667,873 B2 * 3/2014 Hsieh ...................... B25B 27/18 81/186
8,973,471 B2 * 3/2015 Hsieh ...................... B25B 13/04 81/186
9,120,210 B2 * 9/2015 Lee ......................... B25B 13/08
D745,814 S * 12/2015 Hsieh ............................... D8/29
D749,385 S * 2/2016 Solar ................................ D8/28
D751,362 S * 3/2016 Chang .............................. D8/27
D823,083 S * 7/2018 Lee .................................. D8/28
D859,108 S * 9/2019 Chen ................................ D8/27
10,596,685 B2 * 3/2020 Lee ..................... B25B 23/0014
10,919,133 B2 * 2/2021 Kukucka ................. B25B 13/04
11,103,983 B2 * 8/2021 Kukucka ................. B25B 13/04
11,426,839 B2 * 8/2022 Lee ....................... B25B 13/065
11,806,843 B2 * 11/2023 Eggert .................. B25B 13/065
2003/0209111 A1 * 11/2003 Huang .................... B25B 13/08 81/119
2004/0255728 A1 * 12/2004 Hsieh ...................... B25B 13/08 81/186
2006/0150782 A1 * 7/2006 Hsieh ...................... B25B 13/04 81/121.1
2006/0156869 A1 * 7/2006 Hsieh .................... B25B 13/065 81/121.1
2006/0272456 A1 * 12/2006 Hsien ...................... B25B 13/08 81/186
2007/0214915 A1 * 9/2007 Hsieh ...................... B25B 13/04 81/186
2007/0261519 A1 * 11/2007 Cheng ................... B25B 13/065 81/186
2007/0289426 A1 * 12/2007 Chaconas .............. B25B 13/06 84/52
2007/0295170 A1 * 12/2007 Hsieh ...................... B25B 13/08 81/119
2009/0235788 A1 * 9/2009 Hsieh ...................... B25B 13/04 81/121.1
2013/0014614 A1 * 1/2013 Hsieh .................... B25B 13/065 81/119
2016/0288300 A1 * 10/2016 Chen ....................... B25B 13/08
2019/0217449 A1 * 7/2019 Lee ....................... B25B 13/065
2020/0391360 A1 * 12/2020 Kukucka ................. B25B 23/16
2021/0387312 A1 * 12/2021 Kukucka ................. B25B 13/08
2024/0189968 A1 * 6/2024 Chen ....................... B25B 13/08
2024/0217070 A1 * 7/2024 Chen ..................... B25B 13/065
2024/0238946 A1 * 7/2024 Liao ........................ B25B 13/04

* cited by examiner

ANCHOR AND RELEASE TOOL

FIELD OF THE INVENTION

The present invention relates generally to tools designed for tightening or loosening fasteners, in particular bolts and nuts. More specifically, the present invention is an anti-slip torque tool designed to engage bolts, nuts, and other similar fasteners with little chance of slippage through two sets of engagement teeth.

BACKGROUND OF THE INVENTION

Hex bolts, nuts, screws, and other similar threaded devices are used to secure and hold multiple parts together by being engaged to a complimentary thread, known as a female thread. The general structure of these types of fasteners is a cylindrical shaft with an external thread and a head at one end of the shaft. The external thread engages a complimentary female thread tapped into a hole or a nut and secures the fastener in place, binding the associated components together. The head is the means by which the fastener is turned, or driven, into the female threading. The head is shaped specifically to allow an external tool like a wrench to apply a torque to the fastener in order to rotate the fastener and engage the complimentary female threading to a certain degree. This type of fastener is simple, extremely effective, cheap, and highly popular in modern construction.

One of the most common problems in using these types of fasteners, whether male or female, is the tool slipping in the head portion, or slipping on the head portion. This is generally caused by either a worn fastener or tool, corrosion, overtightening, and damage to the head portion of the fastener. The present invention is a wrench or wrench socket design that virtually eliminates slippage. Specifically, the present invention is an anchor and release tool. The anchor and release tool comprises a plurality of sidewalls. An engagement element is laterally integrated into a specific sidewall. Each engagement element further comprises a first tooth and a second tooth. The first tooth is the anchoring tooth, designed to grip the fastener specifically from off the corner off a male hex fastener. The second tooth is the releasing tooth, designed to release the tool from the fastener. The open-end wrench of the present invention engages the fastener with the first tooth in the clockwise direction as well as the counterclockwise direction. The closed end wrench or socket wrench engages the fastener with a combination of first tooth and second tooth.

The anchor and release tool is a novel improvement when compared to current available wrench and socket torque tools. The anchor and release tool solves an industry problem caused by damaged, corroded, rusted and compromised fasteners and over torqued fasteners. The anchor and release tool is able to remove extremely compromised fasteners saving the user time, frustration whilst increasing user safety. Additionally the anchor and release tool is able to prevent fasteners from rounding and wrench slipping due to the novel design features of the present invention. The anchor and release tool is able to turn a new fastener without causing damage to the fastener. However, when the user is faced with removing or tightening a compromised fastener, the anchor and release tool is able to apply sufficient torque to turn the fastener.

DETAIL DESCRIPTIONS OF THE INVENTION

Figure 1:
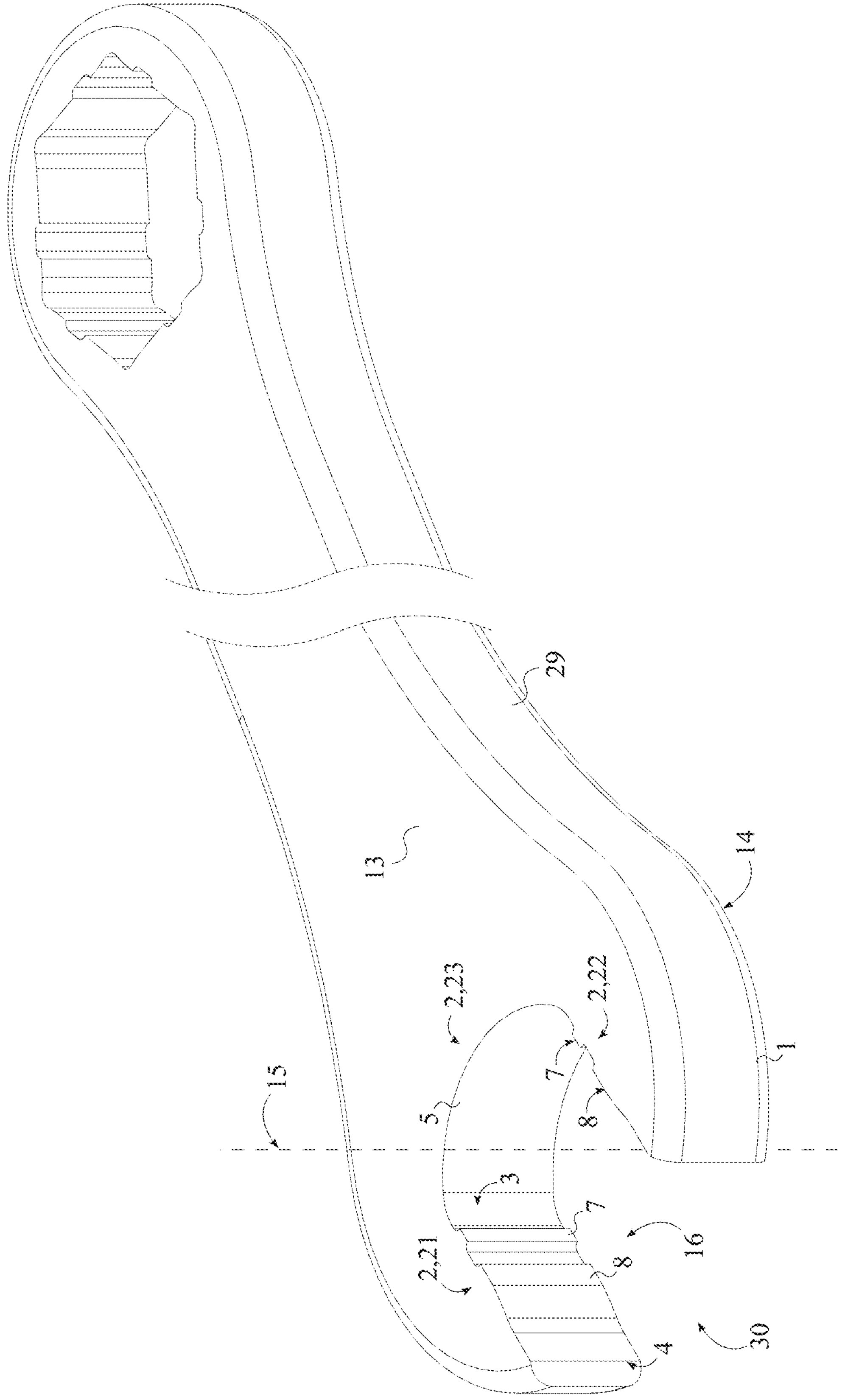
FIG. 1 is a perspective view of the present invention.

All illustrations of the drawings are for the purpose of describing selected versions of the present invention and are not intended to limit the scope of the present invention.

The present invention is an anchor and release tool used to tighten or loosen any fastener such as a nut or bolt. Traditional wrench and wrench socket designs transfer the majority of the torque to the fastener through the lateral corners of the fastener head. Over time, the degradation of the lateral corners reduces the efficiency of transferring torque from the wrench to the fastener head and, as a result, causes slippage. The present invention overcomes this problem through the use of a pair of teeth integrated into the lateral surfaces of the torque tool.

The present invention utilizes at least one engagement element designed to engage the fastener driving surface of the fastener head, damaged or otherwise, in order to efficiently apply torque onto the fastener. The present invention may be integrated into or utilized by a variety of general tools to increase the torque force applied to a fastener. General tools include, but are not limited to, open-end wrenches, adjustable wrenches, pipe wrenches, socket wrenches, plumber wrench, and other similar fastener engaging tools. The present invention is compatible with male-member based head designs of fasteners. Fasteners which utilize a male-member head design, also known as male fasteners, use the external lateral surface of the fastener head to engage a tool for tightening or loosening, such fasteners include hex bolts and nuts. In addition, the present invention is compatible with fasteners of a right-hand thread and fasteners of a left-hand thread. Furthermore, the present invention may be altered and configured to fit different types and different sizes of fasteners.

In reference to FIG. 1-4, the present invention comprises a wrench torque-tool body 1 and an at least one engagement element 16. The wrench torque-tool body 1 is used as a physical structure to apply torque onto the fastener head. The wrench torque-tool body 1 comprises a plurality of internal sidewalls 2, an engagement first base 13, and an engagement second base 14. The length, width, and diameter of the wrench torque-tool body 1 may vary to fit different sized fasteners. The plurality of internal sidewalls 2 delineates a fastener-receiving cavity that is shaped complimentary to the fastener being engaged. In particular, the plurality of internal sidewalls 2 is radially distributed about a pivot axis 15 of the wrench torque-tool body 1. Additionally, each of the plurality of internal sidewalls 2 comprises a sidewall first lateral edge 3, a sidewall second lateral edge 4, and a sidewall base surface 5. A sidewall base surface 5 is defined as been the area delineated between a sidewall first lateral edge 3 and a sidewall second lateral edge 4. The sidewall base 5 may be a flat, convex or concave surface, or any combination of the aforesaid. A sidewall first lateral edge 3 and a sidewall second lateral edge 4 are defined by the internal sidewall 2, or more specifically, the engagement element 16 is defined as been connected to the sidewall base surface 5 of each of the plurality of internal sidewalls 2 between a sidewall first lateral edge 3 and a sidewall second lateral edge 4. A sidewall first lateral edge 3 is positioned along the sidewall base surface 5 adjacent to the second lateral edge 78 of the first tooth 7, accordingly, a sidewall second lateral edge 4 is positioned along the base surface 5 adjacent to the second lateral edge 88 of the second tooth 8. However, in other embodiments, the sidewall first lateral edge 3 and the sidewall second lateral edge 4 may be positioned about the sidewall base surface 5, such that the second lateral edge 78 of the first tooth and the second lateral edge 88 of the second tooth are positioned in between the sidewall first lateral edge 3 and the sidewall second lateral edge 4. In the preferred embodiment the engagement element 16 lacks symmetry along the sidewall base surface 5 of the plurality of internal sidewalls 2 from a first lateral edge 3 to a second lateral edge 4. It is understood that all components of the present invention may be connected by a small radius or radii as required by the manufacturer.

Figure 2:
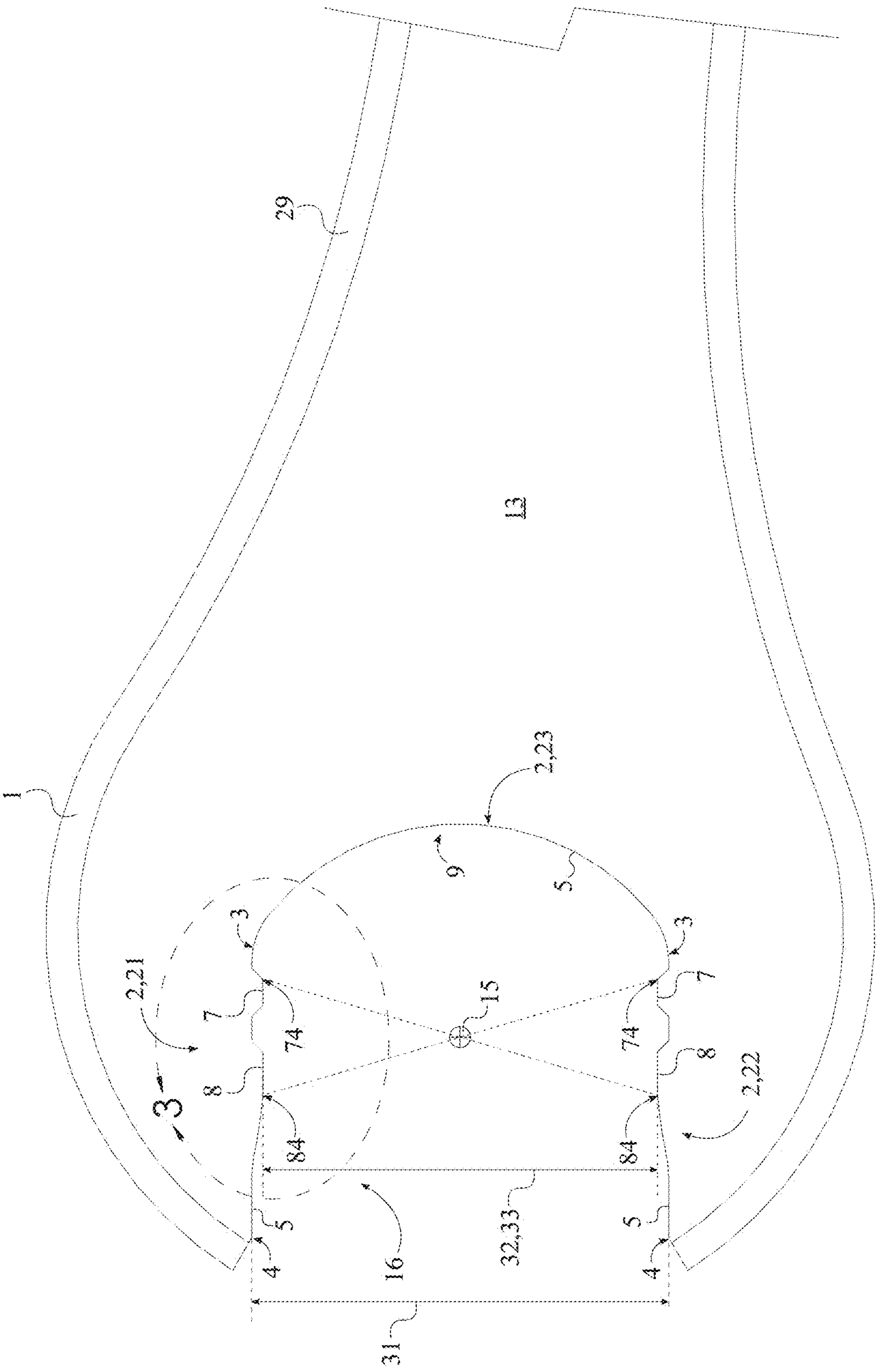
FIG. 2 is a top enlarged view of the present invention.

The engagement element 16 prevents slippage between the wrench torque-tool body 1 and the fastener head. In general, the engagement element 16 is a tooth-like feature that is laterally integrated into a specific sidewall 21 from the plurality of internal sidewalls 2, wherein the specific sidewall 21 denotes any from the plurality of internal sidewalls 2. Referring to FIG. 1 and FIG. 2, the engagement element 16 comprises a first tooth 7 and a second tooth 8. The engagement element 16 is outwardly arranged from the first base 71 of the first tooth 7 and the first base 81 of the second tooth 8 away from the rotational axis and towards the wrench torque-tool body 1. The first tooth 7 and the second tooth 8 are positioned offset from each other along the sidewall base surface 5 of the specific sidewall 21, thereby delineating a pair of engagement teeth 7,8 therein. The first tooth 7 is positioned adjacent to the sidewall first lateral edge 3 and the second tooth 8 is positioned between the first tooth 7 and the sidewall second lateral edge 4 of the specific sidewall 21. In this arrangement, the first tooth 7 is the anchoring tooth capable of gripping a fastener driving surface and preventing the wrench torque-tool body 1 from slipping off the fastener. In contrast, the second tooth 8 is the releasing tooth capable of releasing the wrench torque-tool body 1 from the fastener.

Figure 3:
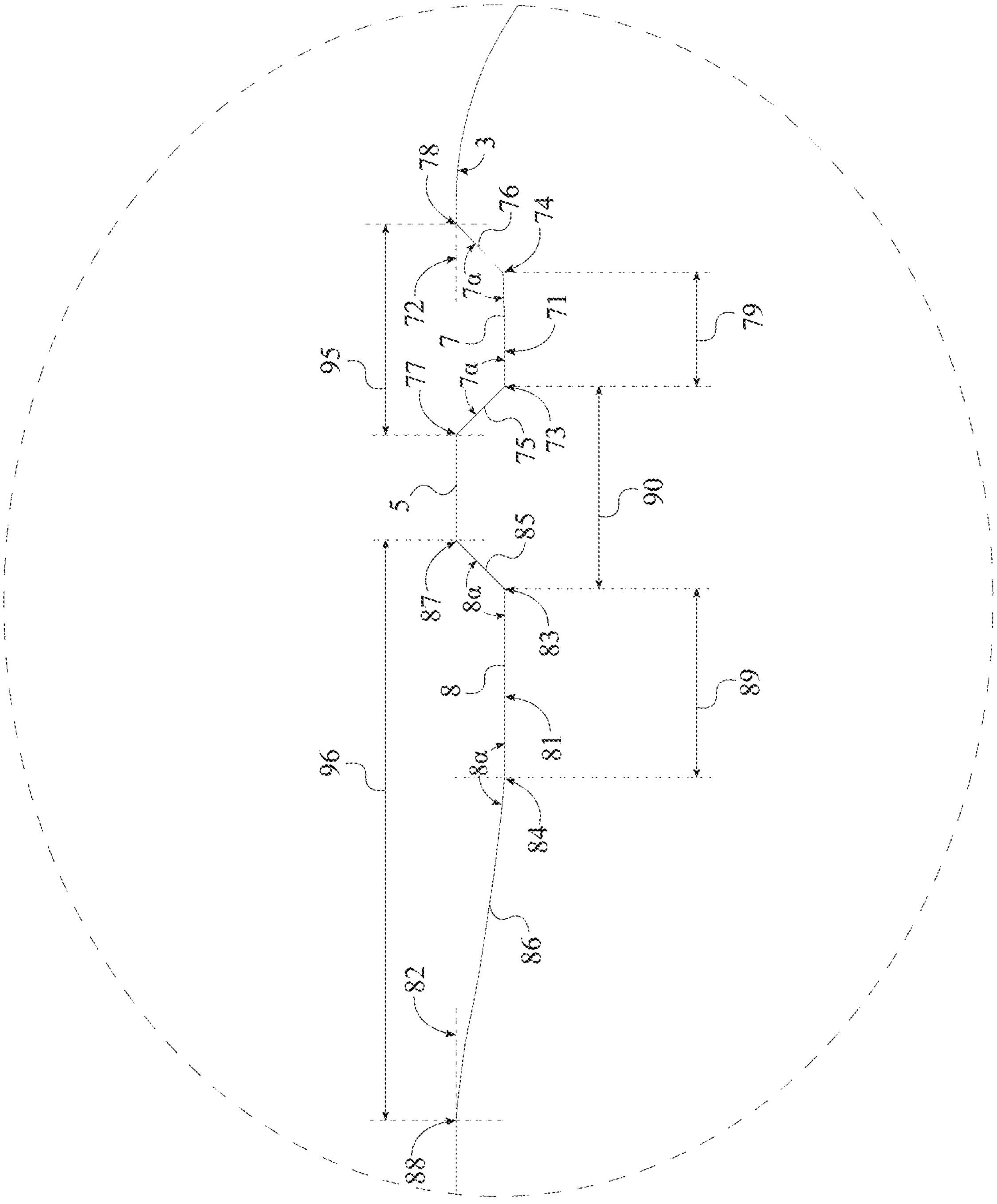
FIG. 3 is a detailed view taken about oval section 3 in FIG. 2.

Both the first tooth 7 and the second tooth 8 each extend normal and away from the sidewall base surface 5 of the specific sidewall 21 and towards the opposing sidewall 22. Referring to FIG. 3, the first tooth 7 and the second tooth 8 each comprise a first base 71, 81 and a second base 72, 82, thereby defining the distal and proximal ends of each tooth, respectively. The second base 72 of the first tooth 7 is terminally connected to the sidewall base surface 5. Furthermore, the second base 72 of the first tooth 7 spans from the engagement first base 13 to the engagement second base 14, thus ensuring the first tooth 7 extends along the pivot axis 15 of the wrench torque-tool body 1. Preferably, the engagement first base 13 and the engagement second base 14 are parallel with each other. However, in some embodiments the engagement first base 13 and the engagement second base 14 are not parallel. The first tooth 7 extends normal and away from the second base 72, up to the first base 71 of the first tooth. The first tooth 7 second base 72 extends from first lateral edge 77 of the first tooth 7 to the second lateral edge 78 of the first tooth 7.

Similarly, the second base 82 of the second tooth 8 is terminally connected to the sidewall base surface 5. Furthermore, the second base 82 spans from the engagement first base 13 to the engagement second base 14, thus ensuring the second tooth 8 extends along the pivot axis 15 of the wrench torque-tool body 1. Preferably, the engagement first base 13 and the engagement second base 14 are parallel with each other. However, in some embodiments the engagement first base 13 and the engagement second base 14 are not parallel. The second tooth 8 extends normal and away from the second base 82, up to the first base 81 of the second tooth. The second tooth 8 second base 82 extends from first lateral edge 87 of the second tooth 8 to the second lateral edge 88 of the second tooth 8.

In some embodiments, the second base 72 of the first tooth 7 and the second base 82 of the second tooth 8 may intersect or adjoin adjacent to the first lateral edge 77 of the first tooth 7 and the first lateral edge 87 of the second tooth 8. Stated another way, both the second base 72 of the first tooth 7 and the second base 82 of the second tooth 8 may extend outward from the sidewall base surface 5 from the first lateral edge 77 to the second lateral edge 87. Stated yet another way, both the second base 72 and the second base 82 may overlap the sidewall base surface 5 within the tooth gap 90.

Regarding overall shape, the first tooth 7 further comprises a first base surface 70, a first end 73, a second end 74, a first lateral side surface 75, and a second lateral side surface 76

Figure 5:
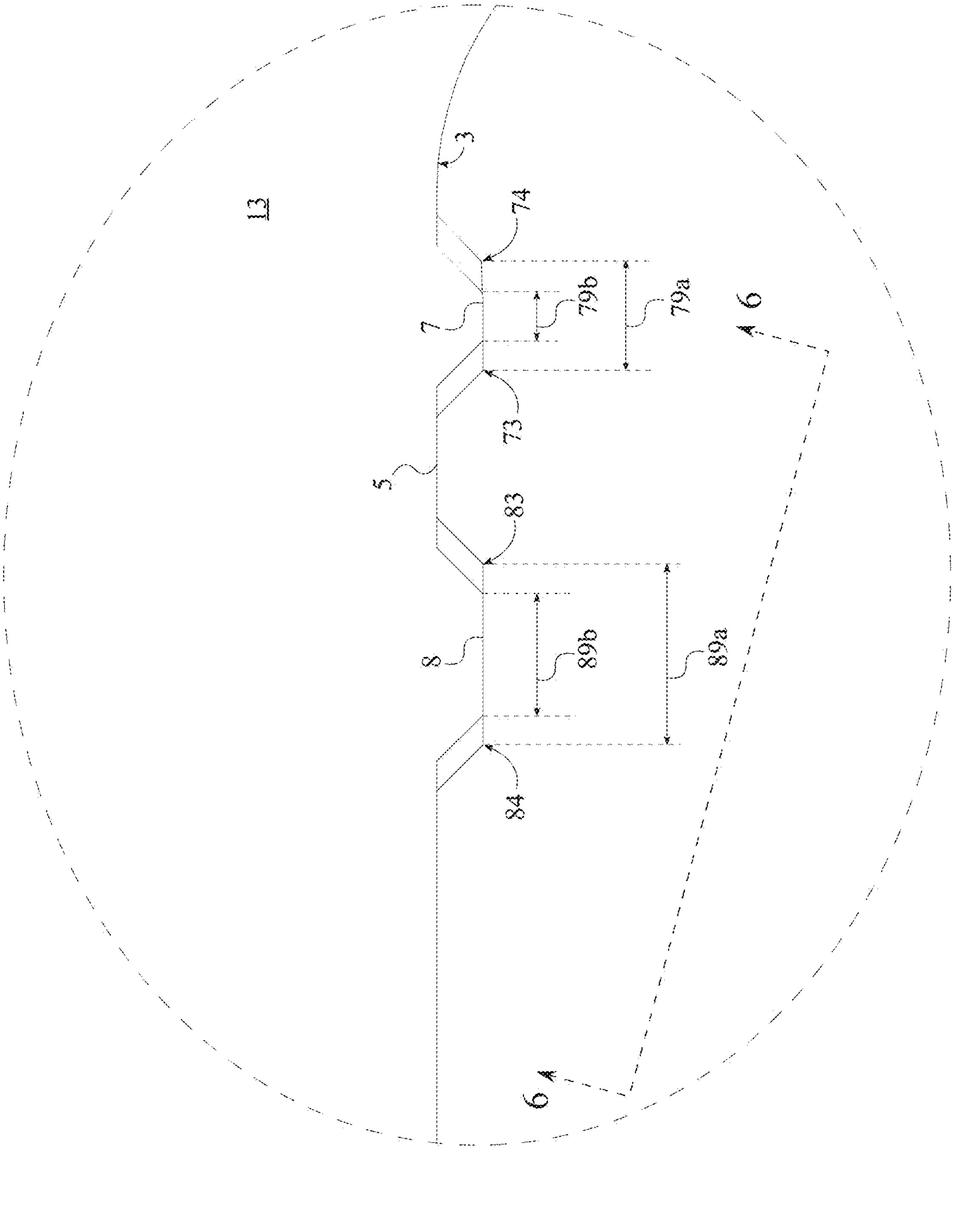
FIG. 5 is an alternative detailed view of the engagement element of the present invention.
Figure 6:
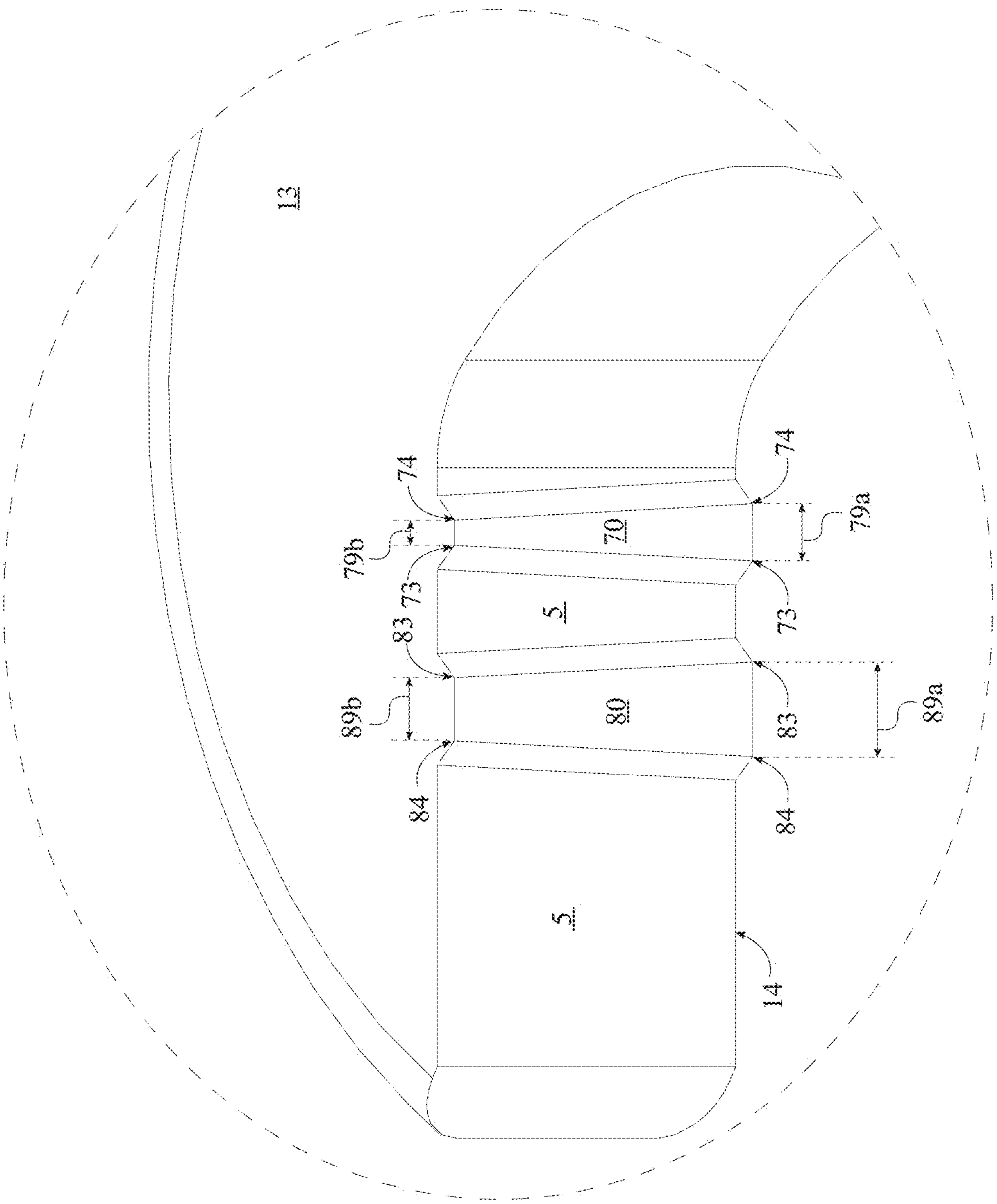
FIG. 6 is a sectional view taken along line 6-6 in FIG. 5.

Referring to FIG. 3, the first end 73 and the second end 74 of the first tooth 7 are oppositely positioned of each other about the first base 71 of the first tooth 7, thereby defining a first base surface 70 therein. Preferably, the first base surface 70 of the first tooth 7 is a smooth, flat surface. However, in other embodiments the first base surface 70 of the first tooth 7 may be a cambered surface or a gripping surface. In particular, the cambered surface may comprise a singular or plurality of angular or radial components or any combination of both. The gripping surface may comprise of any type of surface disturbances, including but not limited to radial or angular serrations, or surface roughness such as knurling. The distance between the first end 73 and the second end 74 of the first tooth 7 delineates a first tooth width 79. Preferably, the first end 73 and the second end 74 of the first tooth 7 are each perpendicular with the engagement first base 13. Stated another way, a first tooth width 79*a* taken from the engagement second base 14 is preferably equal to a first tooth width 79*b* taken from the engagement first base 13. However, in other embodiments as seen in FIG. 5-6, the first tooth 7 may be tapered along the pivot axis 15 such that the first tooth width 79*a* taken from the engagement second base 14 is greater than or less than the first tooth width 79*b* taken from the engagement first base 13. Alternatively, in some embodiments a distance of the first base 71 of the first tooth 7 and the first base 81 of the second tooth 8 along the pivot axis 15 from an engagement first base 13 and an engagement second base 14 may be less than a distance of the second base 72 of the first tooth 7 and the second base 82 of the second tooth 8 along the pivot axis from an engagement first base 13 and an engagement second base 14. In an alternative embodiment, the first tooth width 79 taken adjacent to engagement first base 13 and engagement second base 14 may be equal and the first end 73 and the second end 74 are each perpendicular with engagement first base 13 and engagement second base 14. By tapering the first tooth 7 and or second tooth 8 from the second base 72,82, along the engagement first base 13 and or engagement second base 14 the user could benefit where access is restrictive, either by assisting with access for tight to reach fasteners, or assisting with fitting the tool on to the fastener head.

Figure 4:
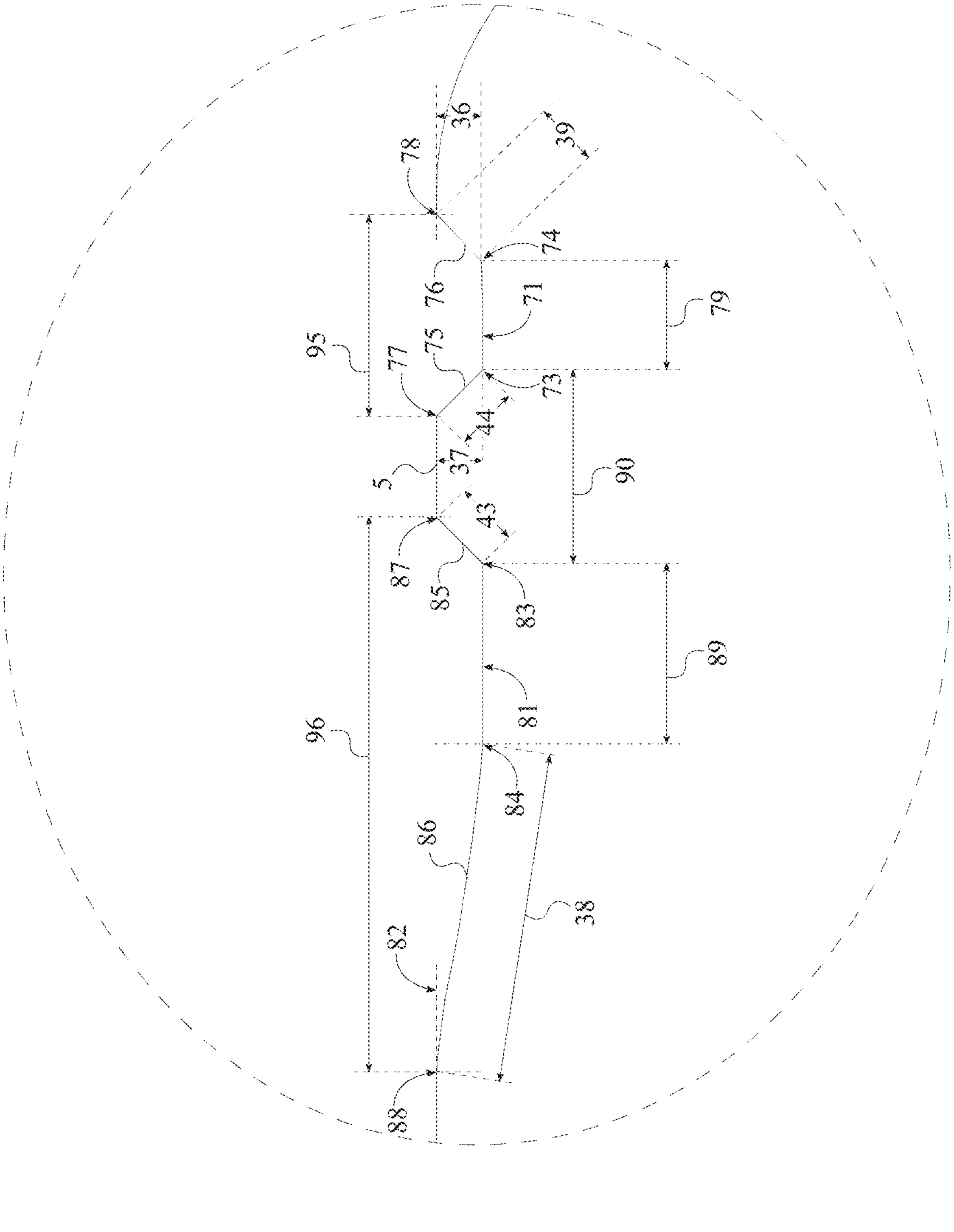
FIG. 4 is another detailed view taken about oval section 3 in FIG. 2.

Continuing with the shape of the first tooth 7, the first lateral side surface 75 and the second lateral side surface 76 are oppositely positioned of each other about the first base surface 70 of the first tooth 7. More specifically, the first lateral side surface 75 extends from the first end 73 to a first lateral edge 77 of the first tooth 7, as seen in FIG. 3. Similarly, the second lateral side surface 76 extends from the second end 74 to a second lateral edge 78 of the first tooth 7. In some embodiments, the second lateral side surface 76 of the first tooth 7 may continue to the sidewall first lateral edge 3. In some embodiments, as seen in FIG. 4, a length 39 of second lateral side surface 76 of the first tooth 7 is greater or less in length than a length 44 of the first lateral side surface 75 of the first tooth 7.

Figure 7:
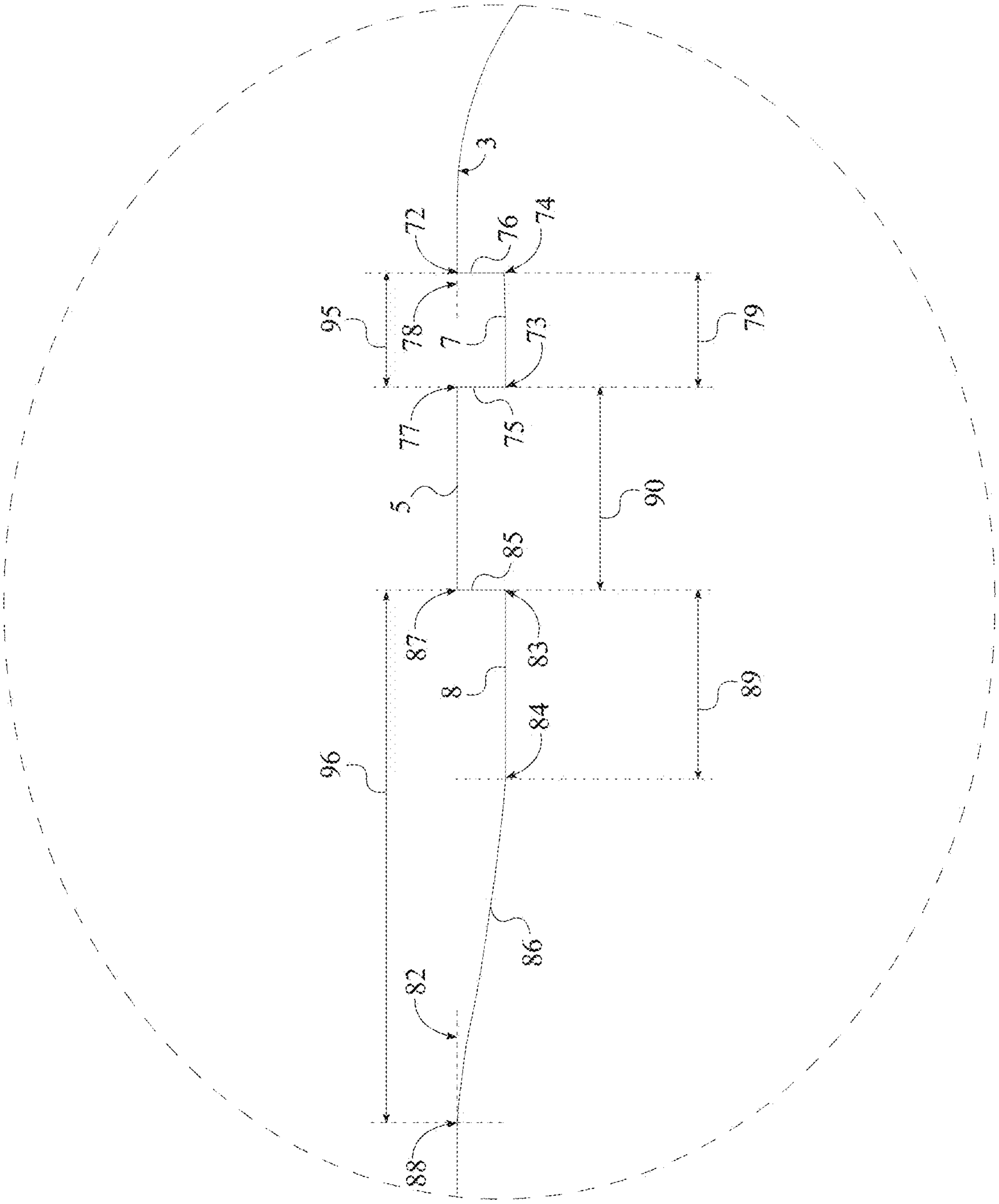
FIG. 7 is another alternative detailed view of the engagement element of the present invention.
Figure 8:
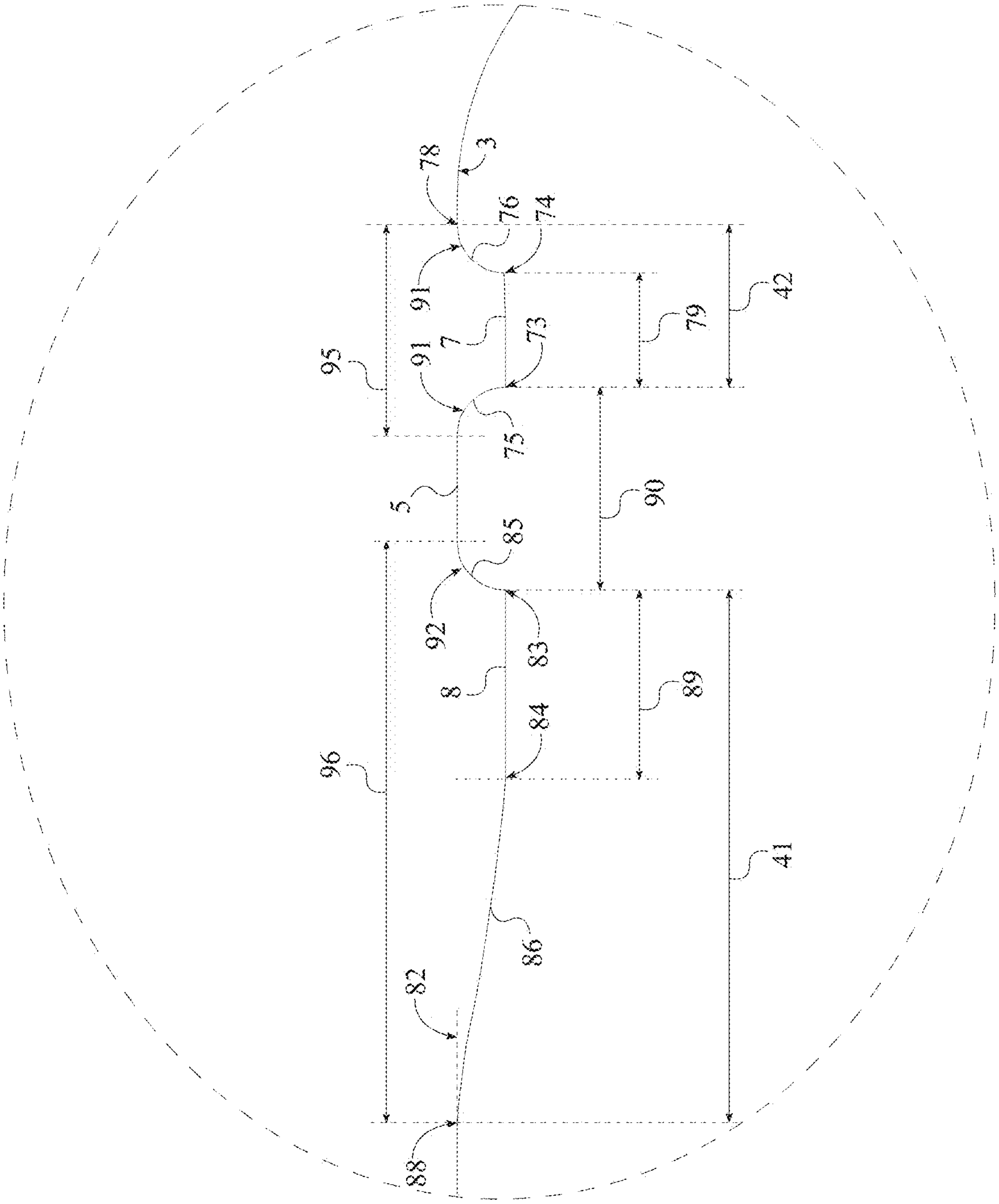
FIG. 8 is another alternative detailed view of the engagement element of the present invention.

In some embodiments, the first lateral side surface 75 and the second lateral side surface 76 of the first tooth 7 are both flat, each extending outward at an obtuse angle 7α with the first base surface 70 of the first tooth 7 towards the second base 72. In other embodiments, the first lateral side surface 75 and the second lateral side surface 76 of the first tooth 7 may be a flat, convex or concave partially circular radius or radii, or angular portions, each extending outward from a first base surface 70 of the first tooth 7 towards the second base 72. Furthermore, a width 95 from the first lateral edge 77 to the second lateral edge 78, measured along the second base 72 of the first tooth 7, is preferably greater than the first tooth width 79. However, the angle and shape of the first and second lateral side surfaces 75, 76 of the first tooth 7 are subject to change. In one embodiment, as seen in FIG. 7, the first lateral side surface 75 and the second lateral side surface 76 of the first tooth 7 are both flat, each oriented perpendicular to the first base surface 70 of the first tooth 7. In another embodiment, the second lateral side surface 76 of the first tooth 7 is contiguous and coplanar with the first base surface 70 of the first tooth 7. In another embodiment, as seen in FIG. 8, an entire cross-section 91 of each the first lateral side surface 75 and the second lateral side surface 76 of the first tooth 7 is a partially-circular, radius or radii concave profile. In another embodiment, both the first lateral side surface 75 and the second lateral side surface 76 are not flat. Rather, both the first lateral side surface 75 and the second lateral side surface 76 of the first tooth 7 each comprise a plurality of angular portions, wherein the plurality of angular portions can either extend outward at an obtuse angle 7α with the first base surface 70 of the first tooth 7 or be oriented perpendicular to the first base surface 70 of the first tooth 7.

Similarly, the second tooth 8 further comprise a first base surface 80, a first end 83, a second end 84, a first lateral side surface 85, and a second lateral side surface 86. Referring to FIG. 3, the first end 83 and the second end 84 of the second tooth 8 are oppositely positioned of each other about the first base 81 of the second tooth 8, thereby defining a first base surface 80 therein. Preferably, the first base surface 80 of the second tooth 8 is a smooth, flat surface. However, in other embodiments the first base surface 80 of the second tooth 8 may be a cambered surface or a gripping surface. In particular, the cambered surface may comprise a singular or plurality of angular or radial components or any combination of both. The gripping surface may comprise of any type of surface disturbances, including but not limited to radial or angular serrations, or surface roughness such as knurling. The distance between the first end 83 and the second end 84 of the second tooth 8 delineates a second tooth width 89. Preferably, the first end 83 and the second end 84 of the second tooth 8 are each perpendicular with the engagement first base 13. Stated another way, a second tooth width 89*a* taken from the engagement second base 14 is preferably equal to a second tooth width 89*b* taken from the engagement first base 13. However, in other embodiments as seen in FIG. 5-6, the second tooth 8 may be tapered along the pivot axis 15 such that the second tooth width 89*a* taken from the engagement second base 14 is greater or less than the second tooth width 89*b* taken from the engagement first base 13.

Figure 14:
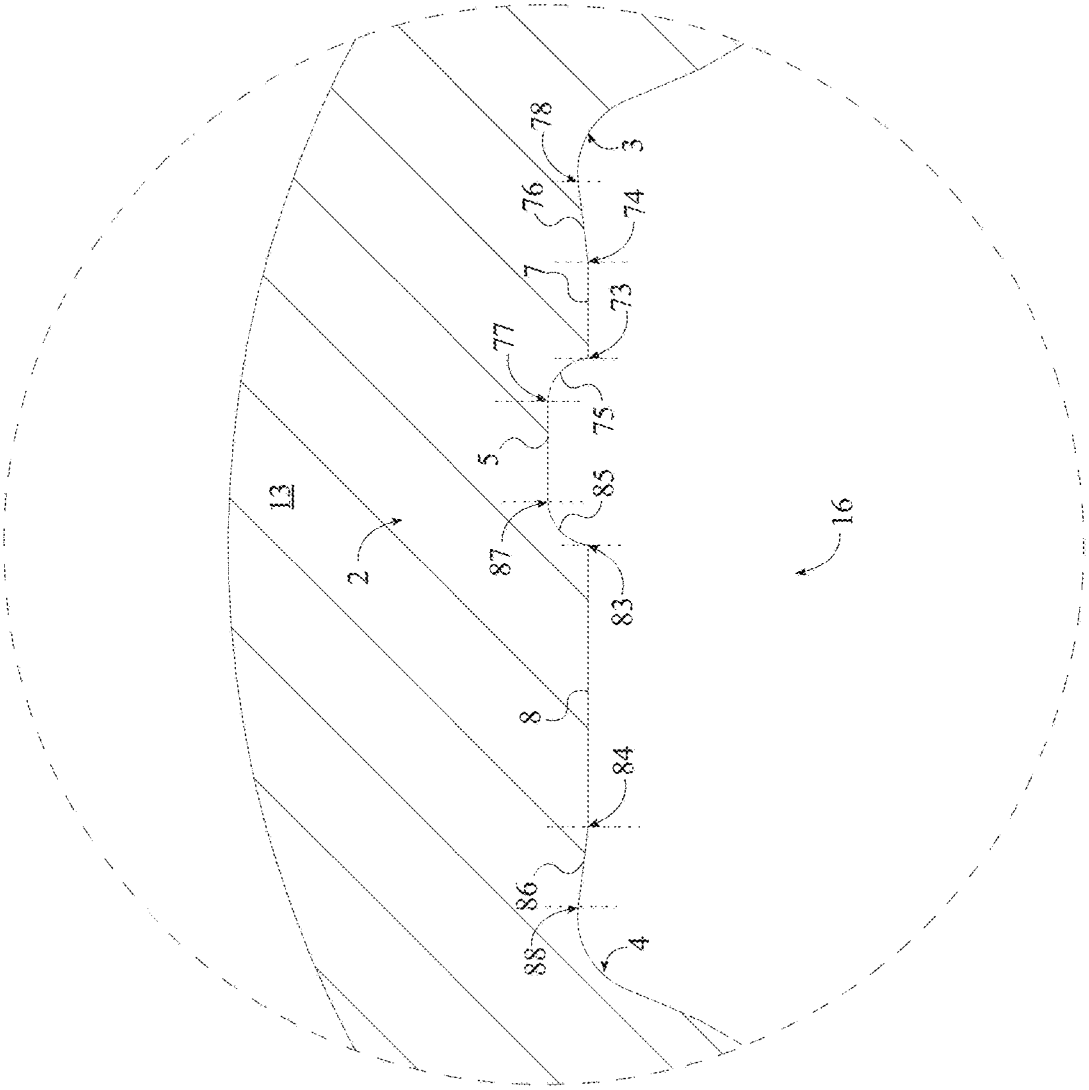
FIG. 14 is a detailed view taken about circular section 14 in FIG. 13.

Continuing with the shape of the second tooth 8, the first lateral side surface 85 and the second lateral side surface 86 are oppositely positioned of each other about the first base surface 80 of the second tooth 8. More specifically, the first lateral side surface 85 extends from the first end 83 to a first lateral edge 87 of the second tooth 8, as seen in FIG. 3. Similarly, the second lateral side surface 86 extends from the second end 84 to a second lateral edge 88 of the second tooth 8. In some embodiments, the second lateral side surface 86 of the second tooth 8 may continue to the sidewall second lateral edge 4. In some embodiments, a length 38 of the second lateral side surface 86 of the second tooth 8 is greater or less in length than a length 43 of the first lateral side surface 85 of the second tooth 8. Additionally, in some embodiments as seen in FIG. 14, a length 38 of the second lateral side surface 86 of the second tooth 8 is equal to a length 39 of the second lateral side surface 76 of the first tooth 7. In other embodiments, the length 38 of the second lateral side surface 86 of the second tooth 8 is greater or less than the length 39 of the second lateral side surface 76 of the first tooth 7.

In some embodiments, the first lateral side surface 85 and the second lateral side surface 86 of the second tooth 8 are both flat, each extending outward at an obtuse angle 8α with the first base 81 of the second tooth 8 towards the second base 82. In other embodiments, the first lateral side surface 85 and the second lateral side surface 86 of the first tooth 8 may be a flat, convex or concave partially circular radius or radii, or a plurality of angular portions, each extending outward from a first base surface 80 of the second tooth 8 towards the second base 82. Furthermore, a width 96 from the first lateral edge 87 to the second lateral edge 88, measured along the second base 82 of the second tooth 8, is preferably greater than the second tooth width 89. In the preferred embodiment, a length of the second tooth width 89 is less than a distance from the first end 83 of the second tooth 8 to a first lateral edge 3. In addition, the second lateral side surface 86 of the second tooth 8 is preferably in the shape of a ramp, preferably being flat convex or concave, comprising of a radius, radii, flat, angular or plurality of angular portions designed to further assist the user when engaging and releasing wrench torque-tool body 1 with a fastener. However, the angle and shape of the first and second lateral side surfaces 85, 86 of the second tooth 8 are subject to change. In one embodiment, as seen in FIG. 7, the first lateral side surface 85 and the second lateral side surface 86 of the second tooth 8 are each oriented perpendicular to the first base surface 80 of the second tooth 8. In another embodiment, the second lateral side surface 86 of the second tooth 8 is contiguous and coplanar with the first base surface 80 of the second tooth 8. In another embodiment, as seen in FIG. 8, an entire cross-section 92 of each the first lateral side surface 85 of the second tooth 8 is a radius or radii, concave profile. In another embodiment, both the first lateral side surface 85 and the second lateral side surface 86 are not flat. Rather, both the first lateral side surface 85 and the second lateral side surface 86 of the second tooth 8 each comprise a plurality of angular portions, wherein the plurality of angular portions can either extend outward at an obtuse angle 8$\alpha$ with the first base surface 80 of the second tooth 8 or be oriented perpendicular to the first base surface 80 of the second tooth 8. Changing the angles of the second lateral side surface 86,76 between a first base surface 80,70, will determine whether the present invention engagement with a fastener is via the sharp corner gripping or biting method, or the friction engagement. By employing a sharp corner to second lateral side surface 76,86, the engagement with a fastener will be the griping or biting method. By reducing the sharpness of the corners of second lateral side surface 76,86, the engagement with a fastener will be the friction and release method.

Regarding tooth size, the first tooth 7 is smaller than the second tooth 8. More specifically, the first tooth width 79 is less than the second tooth width 89, as seen in FIG. 3. In alternative embodiments, the first tooth width 79 may be equal with or greater than a second tooth width 89. A distance from the first base 71 of the first tooth 7 to the second base 72 of the first tooth 7 may be unequal with a distance from the first base 81 of the second tooth 8 to the second base 82 of the second tooth 8. With respect to positioning, in some embodiments, the first end 83 of the second tooth 8 is substantially centered about the specific sidewall 21 along a direction from the sidewall first lateral edge 3 to the sidewall second lateral edge 4. However, in other embodiments, the first end 83 of the second tooth 8 may be positioned off-center about the centerline of the specific sidewall 21.

Regarding tooth arrangement, the first tooth 7 and the second tooth 8 are oriented such that the first lateral side surface 75 of the first tooth 7 and the first lateral side surface 85 of the second tooth 8 are facing each other, spaced apart by a tooth gap 90. As seen in FIG. 3, the tooth gap 90 is measured from the first end 73 of the first tooth 7 to the first end 83 of the second tooth 8. Preferably, the tooth gap 90 is less than the second tooth width 89 but may be less than or more than or equal to the first tooth width 79. In this arrangement, the tooth gap 90 will determine how great the bite the second tooth 8 will be able to apply to the fastener sidewall surface. The larger the tooth gap 90, the greater the pressure may be applied to the fastener sidewall. Conversely, the less the tooth gap 90, the less the second tooth 8 is able to apply pressure on the fastener sidewall surface.

Figure 9:
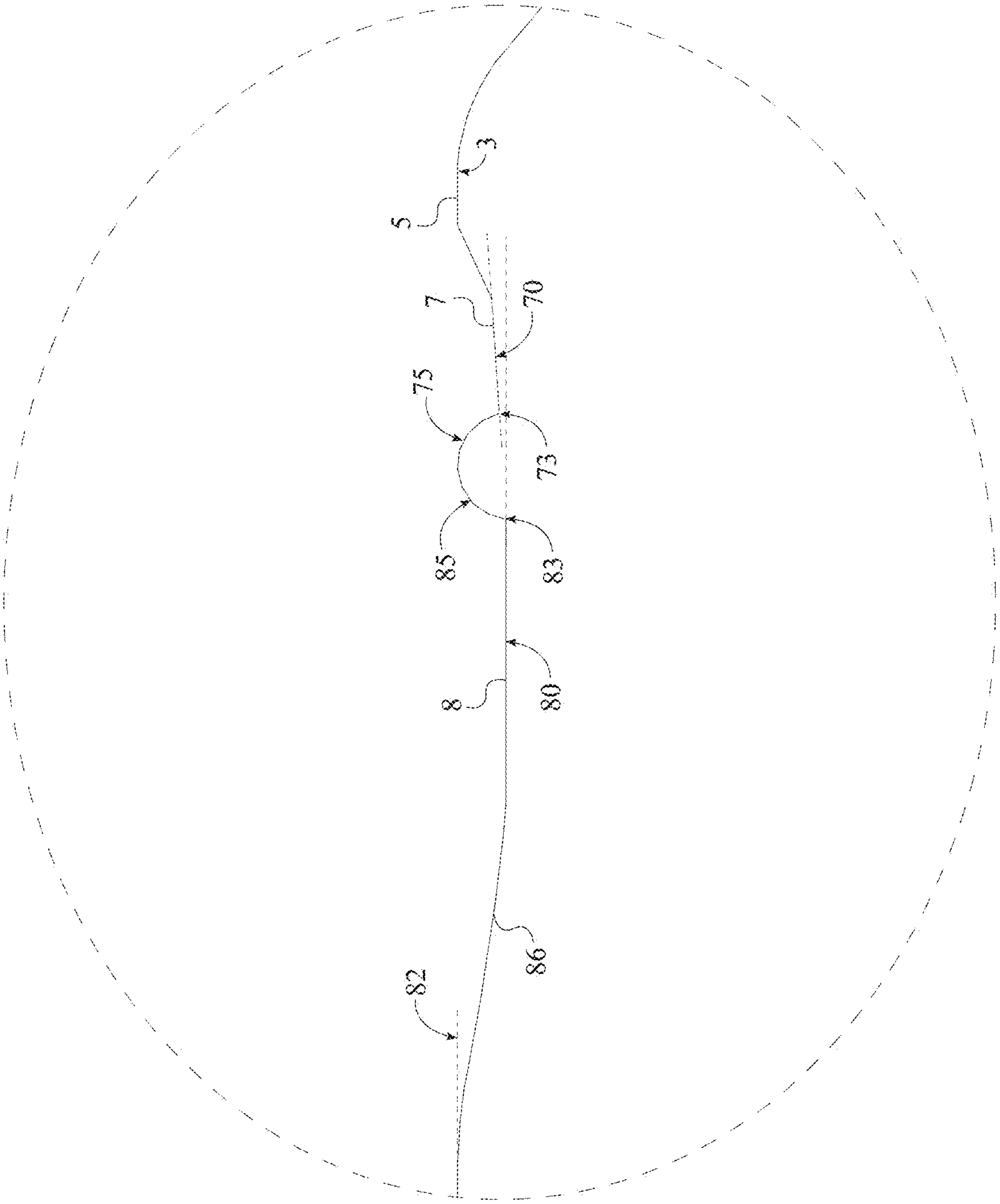
FIG. 9 is another alternative detailed view of the engagement element of the present invention.
Figure 15:
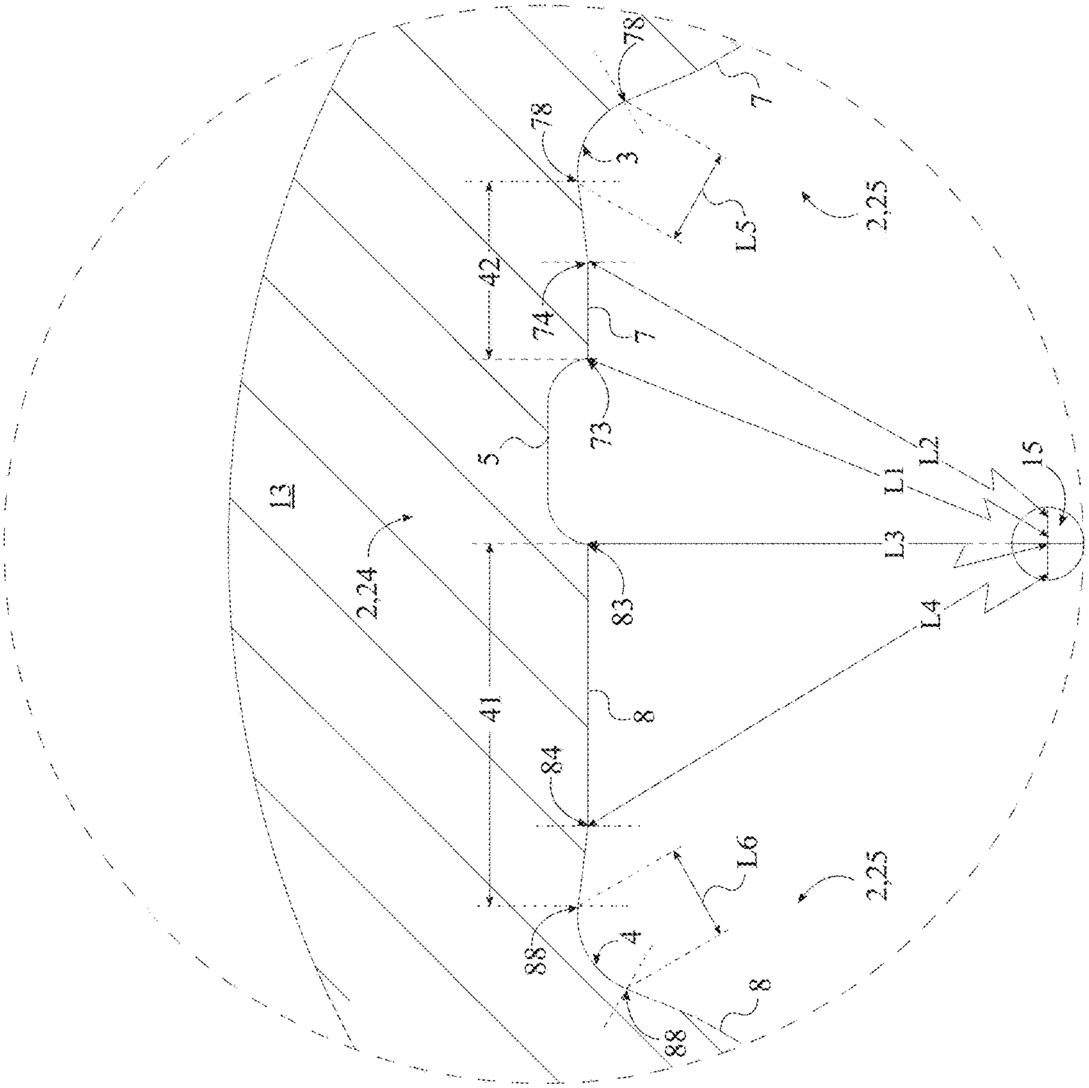
FIG. 15 is another detailed view taken about circular section 14 in FIG. 13.

A further feature of the first tooth 7 and second tooth 8 arrangement along the sidewall base surface 5 being a distance 41 measured from a sidewall second lateral edge 4 adjacent to a second lateral edge 88 of the second tooth 8, to the first end 83 of the second tooth 8, being greater than a distance 42 measured from a sidewall lateral edge 3 adjacent to a first lateral edge 78 of the first tooth 7, to a first end 73 of the first tooth 7, as shown in FIGS. 8 and 15. The distance 41 is preferably arranged from the second lateral edge 4 to a through line 40. This arrangement further positions the teeth in the preferred location along a fastener side surface for optimal engagement with fastener, and use of the novel features of the present invention. The through line 40 may be arranged a distance that is equal between the first lateral edge 3 and the second lateral edge 4. However, in some embodiments a distance from the second lateral edge 4 to the through line 40 may be greater or less than a distance from first lateral edge 3 to the through line 40, such that the through line 40 is not aligned with the pivot axis 15. Preferably, the first base surface 70 of the first tooth 7 and the first base surface 80 of the second tooth 8 are flat and collinear with each other, as seen in FIG. 8. However, in another embodiment as seen in FIG. 9, the first base surface 70 of the first tooth 7 and the first base surface 80 of the second tooth 8 are not collinear. More specifically, the first base surface 70 of the first tooth 7 may taper towards the sidewall base surface 5 of the specific sidewall 21, whereas the first base surface 80 of the second tooth 8 preferably remains parallel and offset from the sidewall base surface 5 of the specific sidewall 21. In this arrangement a distance 44 from a first tooth 7 first base 71 adjacent to the first end 73 measured to the first tooth 7 second base 72 adjacent to first lateral edge 77 may be unequal with a distance 39 from the first tooth 7 first base 71 adjacent to a second end 74 measured to first tooth 7 second base 72 adjacent to second lateral edge 78. Further, by tapering the first base surface 70 of the first tooth 7 towards the sidewall base surface 5 of the specific sidewall 21 as shown in FIG. 9, the first base surface 70 of the first tooth 7, will apply greater pressure to the fastener sidewall surface about the first end 73 and less pressure to the fastener sidewall surface about the second end 74. In this arrangement, the distance between the first end 73 of the first tooth 7 and the second base 72 may be unequal with the distance between the second end 74 of the first tooth 7 and the second base 72. This will enable the engagement with the fastener sidewall surface and the engagement element 16 to be off the fastener corner, preventing fastener damage and rounding. Alternatively, the first base surface 80 of the second tooth 8 may be offset and not parallel with the sidewall base surface 5 of the specific sidewall 21. Preferably the first base surface 70 of the first tooth 7 of the specific sidewall 21 is not parallel with a first base surface 70 of the first tooth 7 of an opposing sidewall 22, however in some embodiments the first base surface 70 of the first tooth 7 of the specific sidewall 21 is parallel with a first base surface 70 of the first tooth 7 of an opposing sidewall 22.

Preferably the first base surface 80 of the second tooth 8 of the specific sidewall 21 is parallel with a first base surface 80 of the second tooth 8 of an opposing sidewall 22, however in some embodiments the first base surface 80 of the second tooth 8 of the specific sidewall 21 is not parallel with a first base surface 80 of the second tooth 8 of an opposing sidewall 22.

Figure 13:
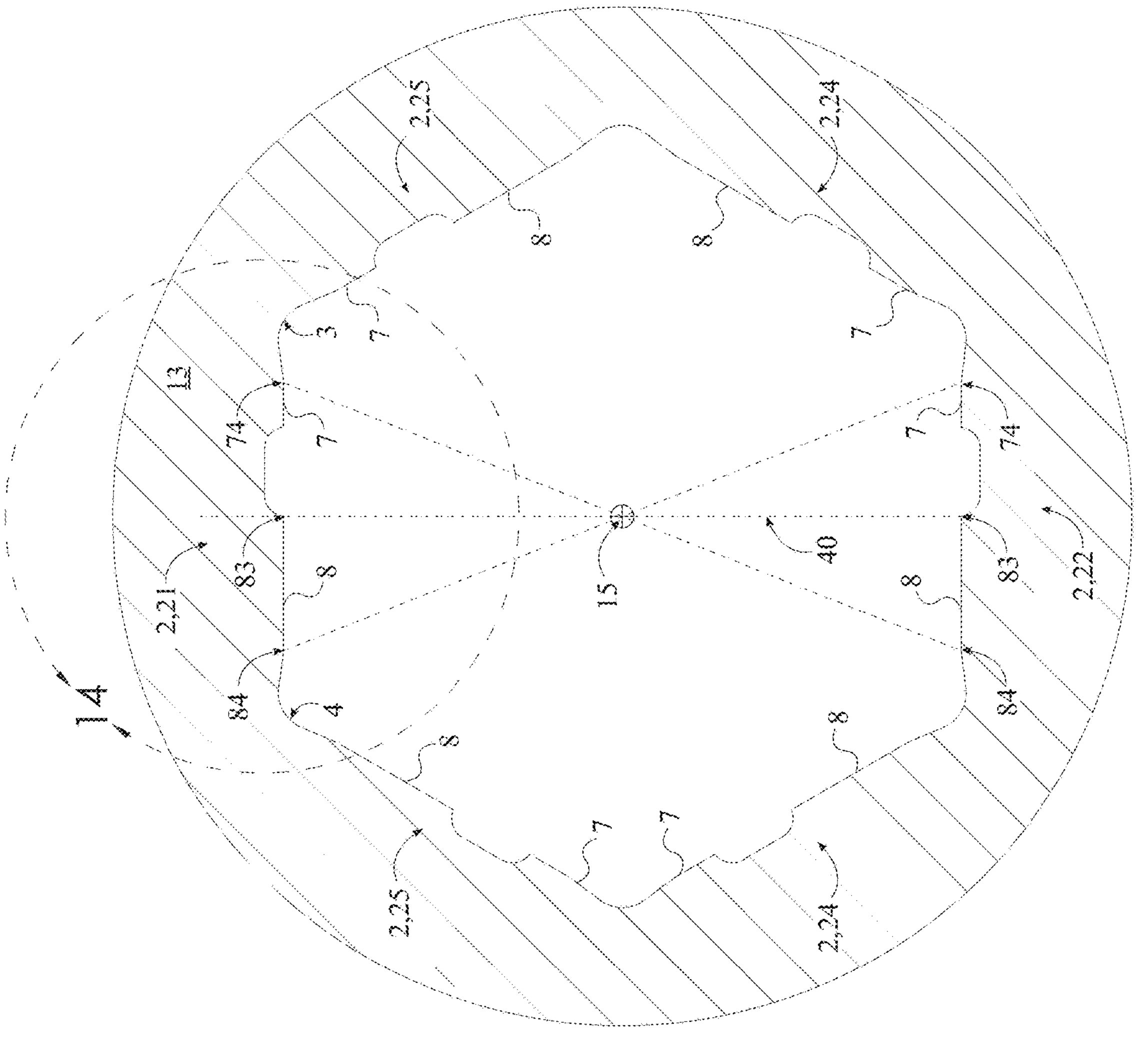
FIG. 13 is a cross-sectional view taken along line 13-13 in FIG. 12.

In reference to FIG. 2 and FIG. 13, the plurality of internal sidewalls 2 further comprises an opposing sidewall 22, wherein the opposing sidewall 22 is positioned opposite to the specific sidewall 21, across the wrench torque-tool body 1. Preferably, the opposing sidewall 22 is also oriented parallel with the specific sidewall 21. However, in other embodiments, the opposing sidewall 22 may not be parallel with the specific sidewall 21, such that the opposing sidewall 22 is angularly offset from the specific sidewall 21. Preferably, the second tooth 8 on a specific sidewall 21 is opposingly aligned with the second tooth 8 on an opposing sidewall 22 from the plurality of internal sidewalls 2. More specifically, as seen in FIG. 13, the first end 83 of a second tooth 8 on a specific sidewall 21 is aligned with the first end 83 of the second tooth 8 on an opposing sidewall 22. However, in other embodiments, a first end 83 of a second tooth 8 on a specific sidewall 21 may be offset and not aligned with the first end 83 of a second tooth 8 on an opposing sidewall 22. Further, in some embodiments a through line 40 from a first end 83 of the second tooth 8 on a specific sidewall 21 connected to first end 83 of the second tooth 8 on an opposing sidewall 22 is aligned with the pivot axis 15, in other embodiments a through line 40 from a first end 83 of the second tooth 8 on a specific sidewall 21 connected to first end 83 of the second tooth 8 on an opposing sidewall 22 is not aligned and offset with the pivot axis 15.

Preferably, the first tooth 7 on a specific sidewall 21 is positioned diagonally opposing the second tooth 8 of an opposing sidewall 22. More specifically, as seen in FIG. 2 and FIG. 13, the second end 74 of the first tooth 7 on the specific sidewall 21 is axial-diagonally oriented with the second end 84 of the second tooth 8 on the opposing sidewall 22. In this arrangement, the first tooth 7 is designed to grip with the fastener. Once the fastener is removed, the second tooth 8 is designed to release the fastener from the wrench torque-tool body 1. By employing this diagonal opposing method of the first tooth 7 with the second tooth 8, wherein the first tooth 7 being the gripping tooth with a sharper corner engagement about the second end 74, whereas the second tooth 8 employing a reduced sharpness corner second end 84 utilizing a friction engagement providing the user with a the gripping and releasing features of the present invention. Further, in some embodiments, the engagement element 16 of the specific sidewall 21, engagement with a fastener lacks symmetry with the engagement element 16 of the opposing sidewall 22 engagement with the fastener. In other words, if during rotation of the torque tool body 1 the engagement element 16 of the specific sidewall 21 engages with a fastener is by way off first tooth 7, then the engagement element 16 of the opposing sidewall 22 engages with a fastener by way of second tooth 8. Stated yet another way, the engagement element 16 of the specific sidewall 21 engagement with a fastener is opposite with the engagement element 16 of the opposing sidewall 22 engagement with a fastener.

Referring to FIG. 15, a distance L1 from the pivot axis 15 to the first end 73 of the first tooth 7 is less than a distance L2 from the pivot axis 15 to the second end 74 of the first tooth 7. Similarly, a distance L3 from the pivot axis 15 to the first end 83 of the second tooth 8 is less than a distance L4 from the pivot axis 15 to the second end 84 of the second tooth 8. A distance L3 from the pivot axis 15 to the first end 83 of the second tooth 8 is less than a distance L1 from the pivot axis 15 to the first end 73 of the first tooth 7.

In reference to FIG. 13, the plurality of internal sidewalls 2 further comprises an arbitrary sidewall 24 and an adjacent sidewall 25. The arbitrary sidewall 24 denotes any sidewall from the plurality of internal sidewalls 2, and the adjacent sidewall 25 is positioned directly next to the arbitrary sidewall 24. Preferably, the arbitrary sidewall 24 is adjacently adjoined to the adjacent sidewall 25 by a curved corner. Resultantly, corners formed within the plurality of internal sidewalls 2 are curved to a certain degree, the degree is subject to change to meet the needs and preferences of the user. Alternatively, the arbitrary sidewall 24 is adjacently adjoined to the adjacent sidewall 25 by an angled corner. Resultantly, corners formed within the plurality of internal sidewalls 2 are angled to a certain degree, the degree is subject to change to meet the needs and preferences of the user. The plurality of internal sidewalls 2 is preferably flat and colinear about the sidewall base surface 5, however the plurality of internal sidewalls 2 may be convex or concave about the sidewall surface 5 and or not colinear.

In reference to FIG. 15, the first tooth 7 on an arbitrary sidewall 24 is positioned adjacent to the first tooth 7 on an adjacent sidewall 25, separated by a distance L5. More specifically, the second lateral edge 78 of the first tooth 7 on an arbitrary sidewall 24 is offset from the second lateral edge 78 of the first tooth 7 on an adjacent sidewall 25 by a distance L5. Similarly, the second tooth 8 on an arbitrary sidewall 24 is positioned adjacent to the second tooth 8 on an adjacent sidewall 25, separated by a distance L6. More specifically, the second lateral edge 88 of the second tooth 8 on an arbitrary sidewall 24 is separated from the second lateral edge 88 of the second tooth 8 on an adjacent sidewall 25 by a distance L6. In this arrangement, the tooth gap 90, the distance L5, and the distance L6 further allow fastener material into the receiving space of the wrench torque-tool body 1, which in turn, provides the first tooth 7 additional grip with the fastener sidewall.

Furthermore, the plurality of internal sidewalls 2 is preferably curved for maximum clearance and engagement. Referring to FIG. 2, an intermediate sidewall 23 from the plurality of internal sidewalls 2 is perpendicularly positioned in between the specific sidewall 21 and the opposing sidewall 22. The intermediate sidewall 23 is preferably concave shaped to provide clearance for the fastener head and to increase the chances for the fastener head to engage the engagement element 16. More specifically, a cross-section 9 of the intermediate sidewall 23 is preferably a partially-circular profile; wherein the partially-circular profile is preferably a radius, radii but may be a plurality of angular portions and concave along a direction from the sidewall first lateral edge 3 to the sidewall second lateral edge 4 of the intermediate sidewall 23. However, in other embodiments, the entire cross-section 9 of the intermediate sidewall 23 may be a flat profile or a convex profile. Alternatively, the cross section 9 of the intermediate sidewall 23 may be a plurality of angular shapes. Further, in some embodiments the intermediate sidewall 23 may incorporate one or more teeth.

In reference to FIG. 1-2, wherein the present invention is an open-end wrench with multiple gripping features, the present invention further comprises a wrench handle 29 and a fastener-receiving opening 30. The fastener-receiving opening 30 allows the present invention to engage the fastener head laterally, similar to traditional open-end wrenches, as seen in FIG. 1. In particular, the fastener-receiving opening 30 traverses through the wrench torque-tool body 1, perpendicular to the pivot axis 15. Additionally, the fastener-receiving opening 30 is preferably positioned opposite the wrench handle 29 and the intermediate sidewall 23, across the wrench torque-tool body 1. In relation to the engagement element 16, the fastener-receiving opening 30 is oriented parallel to the specific sidewall 21, wherein the second lateral edge 4 of each the specific sidewall 21 and the opposing sidewall 22 is positioned on the open end facing away from the fastener-receiving opening 30. Preferably, the lateral edge 4 is positioned in between the second lateral edge 88 of the second tooth 8 and the fastener-receiving opening 30. The fastener receiving opening 30 is wider than traditional open-end wrenches on the market today. This feature acts as a guide and assists with fastener engagement, especially when fasteners are in hard to reach areas or fastener visibility is obscured by other parts. In particular, a width 31 of the fastener-receiving opening 30 is larger than a width 32 of two diametrically opposing first teeth 7 and a width 33 of two diametrically opposing second teeth 8. Here, the width 31 of the fastener-receiving opening 30 is measured from the sidewall base surface 5 on the specific sidewall 21 to the sidewall base surface 5 on the opposing sidewall 22. The width 32 of two diametrically opposing first teeth 7 is measured from the first base surface 70 of the first tooth 7 on the specific sidewall 21 to the first base surface 70 of the first tooth 7 on the opposing sidewall 22. The width 33 of two diametrically opposing second teeth 8 is measured from the first base surface 80 of the second tooth 8 on the specific sidewall 21 to the first base surface 80 of the second tooth 8 on the opposing sidewall 22. Further, in some embodiments, the base surface 5 between the fastener receiving opening 30 and the second lateral edge 4 may be offset and not parallel with the base surface 5 between the first lateral edge 3 and the second lateral edge 4 of the specific sidewall 21 and or the opposing sidewall 22.

The wrench handle 29 is externally and laterally connected to the wrench torque-tool body 1 and acts as a lever arm to substantially increase the torque force applied to the fastener. The length of the wrench handle 29 may vary depending on the torque force required to remove the fastener; a longer wrench handle 29 produces a greater torque force and vice versa. Furthermore, the general shape, design, and material composition of the wrench handle 29 may also vary to accommodate the needs of the user. For example, the wrench handle 29 may be padded at various regions to alter the handling characteristics of the tool to increase case of use and comfort for the user. In an alternative design, the wrench handle 29 may be substituted with the engagement bore 28 opposite the fastener receiving opening 30 known as a crow foot design. The engagement bore 28 enables the user to apply torque to the wrench torque tool body. The crows foot design is especially useful in hard to access situations where the crow foot design smaller foot print gives the user greater access without damaging or rounding a fastener due to the present invention unique engagement features. In another embodiment the engagement elements 16 of the present invention may be incorporated into a flare nut wrench design wherein the opening 30 is delineated between the junction of two internal sidewalls 2, whereby a portion of the arbitrary sidewall and a portion of the adjacent sidewall adjacent to the curved corner are removed to create the fastener receiving opening 30.

Figure 10:
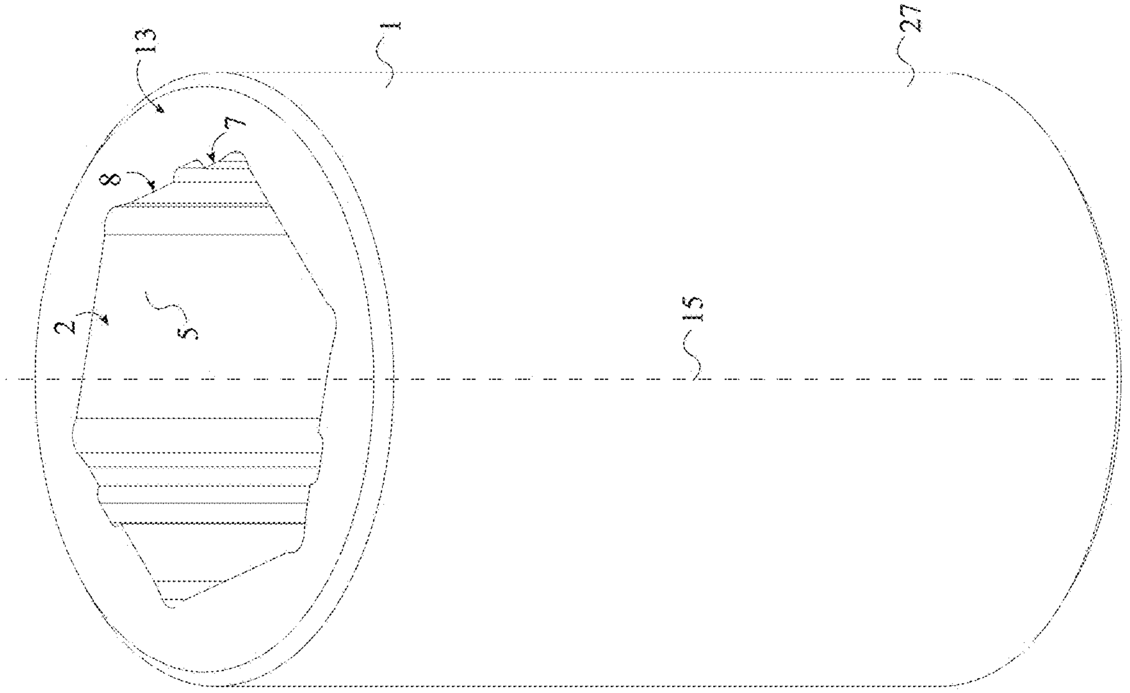
FIG. 10 is a top perspective view of an alternative embodiment of the present invention.
Figure 11:
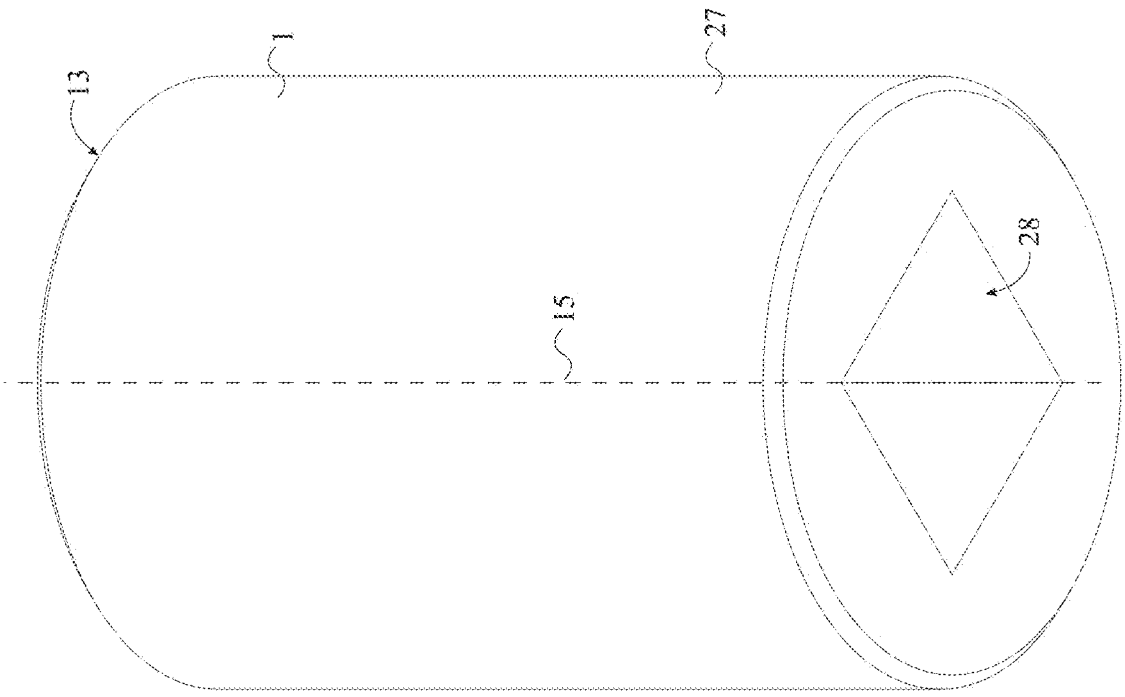
FIG. 11 is a bottom perspective view of the alternative embodiment.
Figure 12:
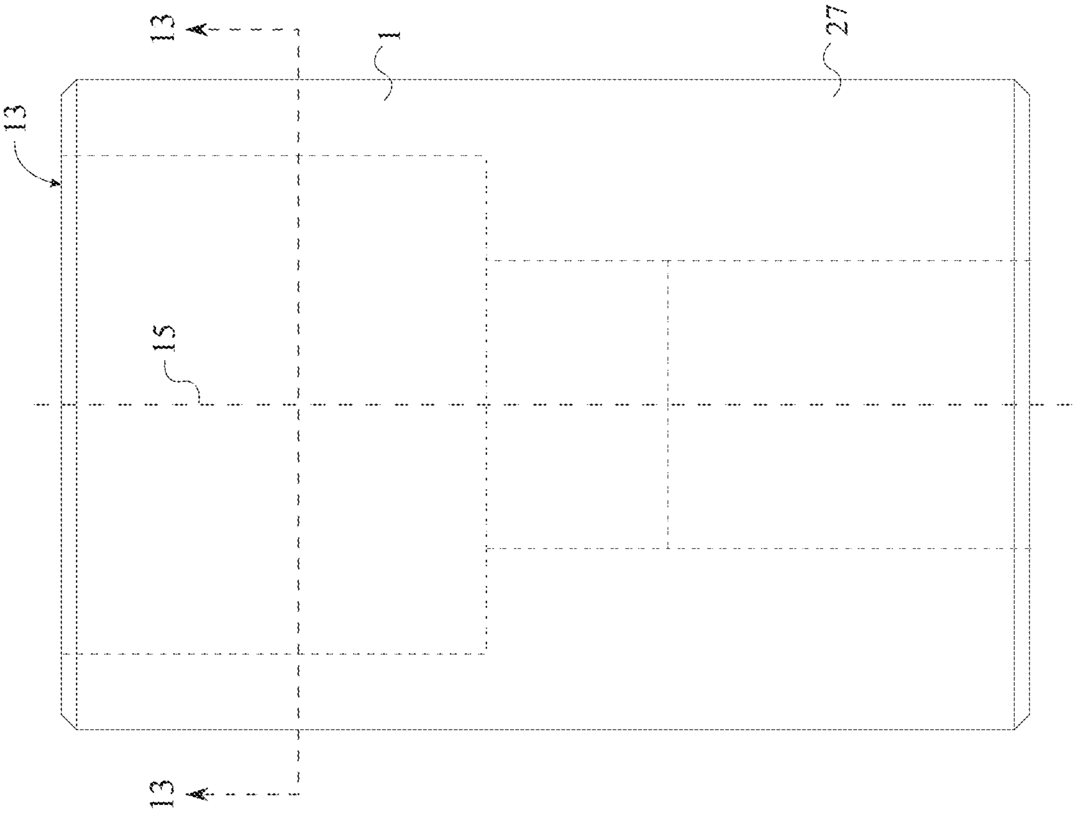
FIG. 12 is a front elevational view of the alternative embodiment of the present invention.
Figure 16:
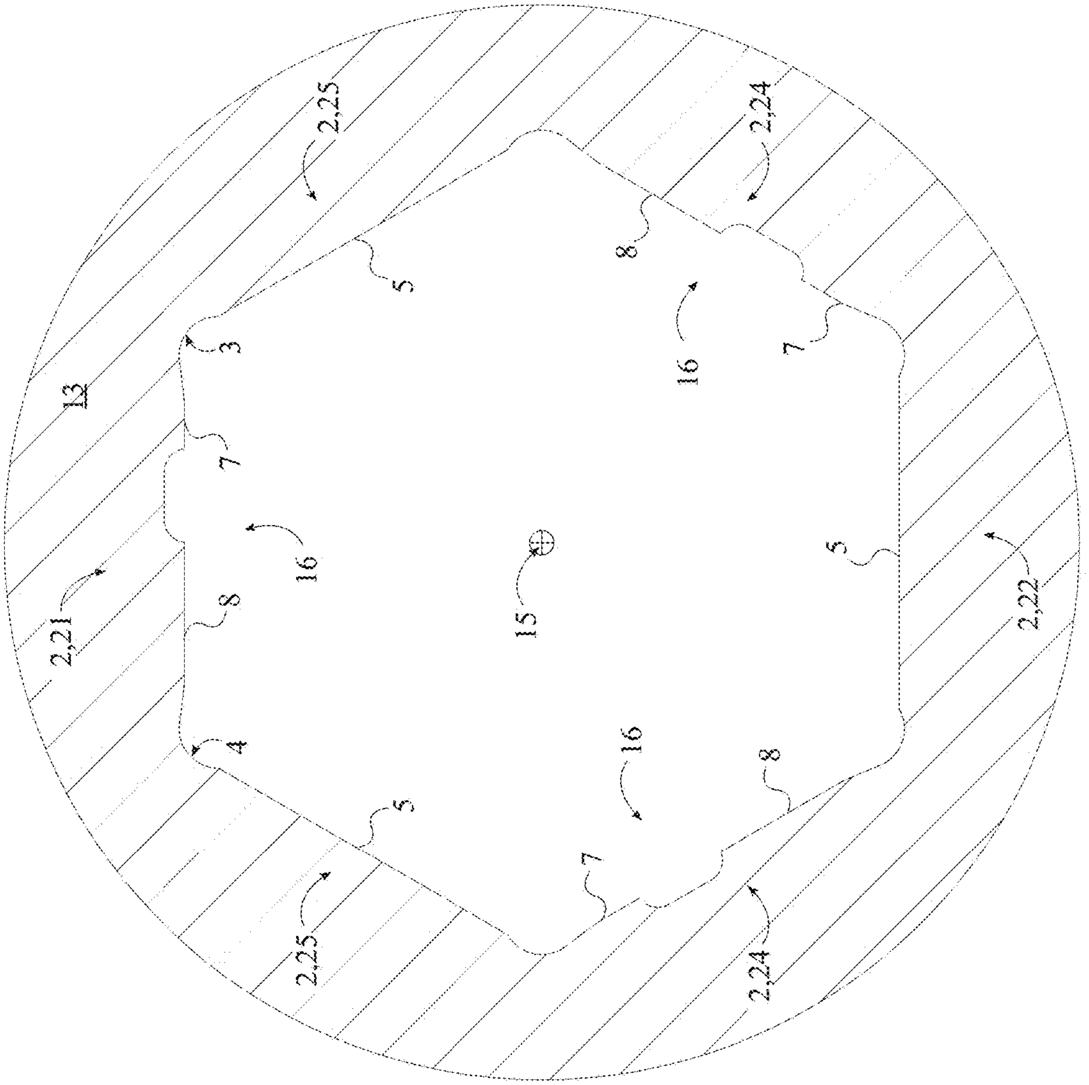
FIG. 16 is an alternative cross-sectional view taken along line 13-13 in FIG. 12 of the alternative embodiment, showing the engagement elements on every other sidewall.

In reference to FIG. 10, in one embodiment of the present invention, the plurality of engagement elements 16 is radially distributed about the pivot axis 15 with each of the plurality of engagement elements 16 being laterally integrated into a corresponding sidewall from the plurality of internal sidewalls 2. The number within the plurality of engagement elements 16 to the number within the plurality of internal sidewalls 2 is subject to change. In one embodiment as seen in FIG. 13, the plurality of engagement elements 16 equals the plurality of internal sidewalls 2. In another embodiment as seen in FIG. 16, the plurality of engagement elements 16 is distributed amongst every other from the plurality of internal sidewalls 2. In reference to FIG. 10-16, the wrench torque-tool body 1 is a tubular extrusion sized to fit over the male fastener in an interlocking manner, essentially a wrench socket, a closed-end wrench, or a nut driver.

The present invention also incorporates an attachment feature which allows an external torque tool to attach to the wrench torque-tool body 1 and increase the torque force applied to the fastener. In reference to FIG. 10-12, the present invention comprises an attachment body 27 and an engagement bore 28 that allow an external tool such as a socket wrench or ratchet to be attached to the wrench torque-tool body 1. The attachment body 27 is centrally positioned around and along the pivot axis 15 in order to align with the axis wrench torque-tool body 1. The attachment body 27 is preferably of a cylindrical design with a diameter slightly larger than the diameter of the wrench torque-tool body 1, however the attachment body 27 may be the same size or smaller in diameter than the wrench torque tool body 1. The engagement bore 28 traverses into the attachment body 27 along the pivot axis 15, opposite the wrench torque-tool body 1. The engagement bore 28 is shaped to receive a male attachment member of a socket wrench. The preferred shape is square as the majority of socket wrenches utilize a square attachment member. In alternative embodiments, the shape and design of the engagement bore 28 and the attachment body 27 may vary to be adaptable to different torque tools and different attachment means. In one embodiment, only the attachment body 27 is utilized, wherein the attachment body 27 is shaped to fit within an external wrench. In particular, the attachment body 27 is hexagonal shaped for example, although other geometric shapes may also be utilized.

Figure 17:
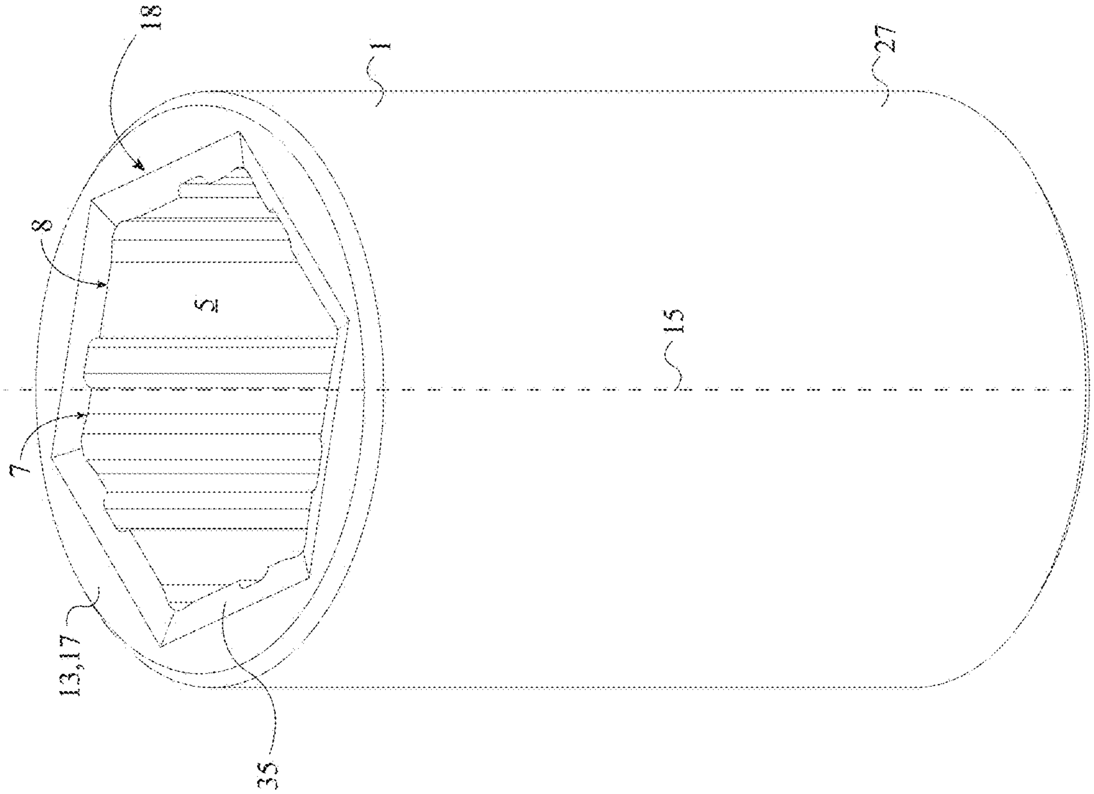
FIG. 17 is a top perspective view of an alternative embodiment of the present invention, showing the top chamfered surface and the six angular portions.
Figure 18:
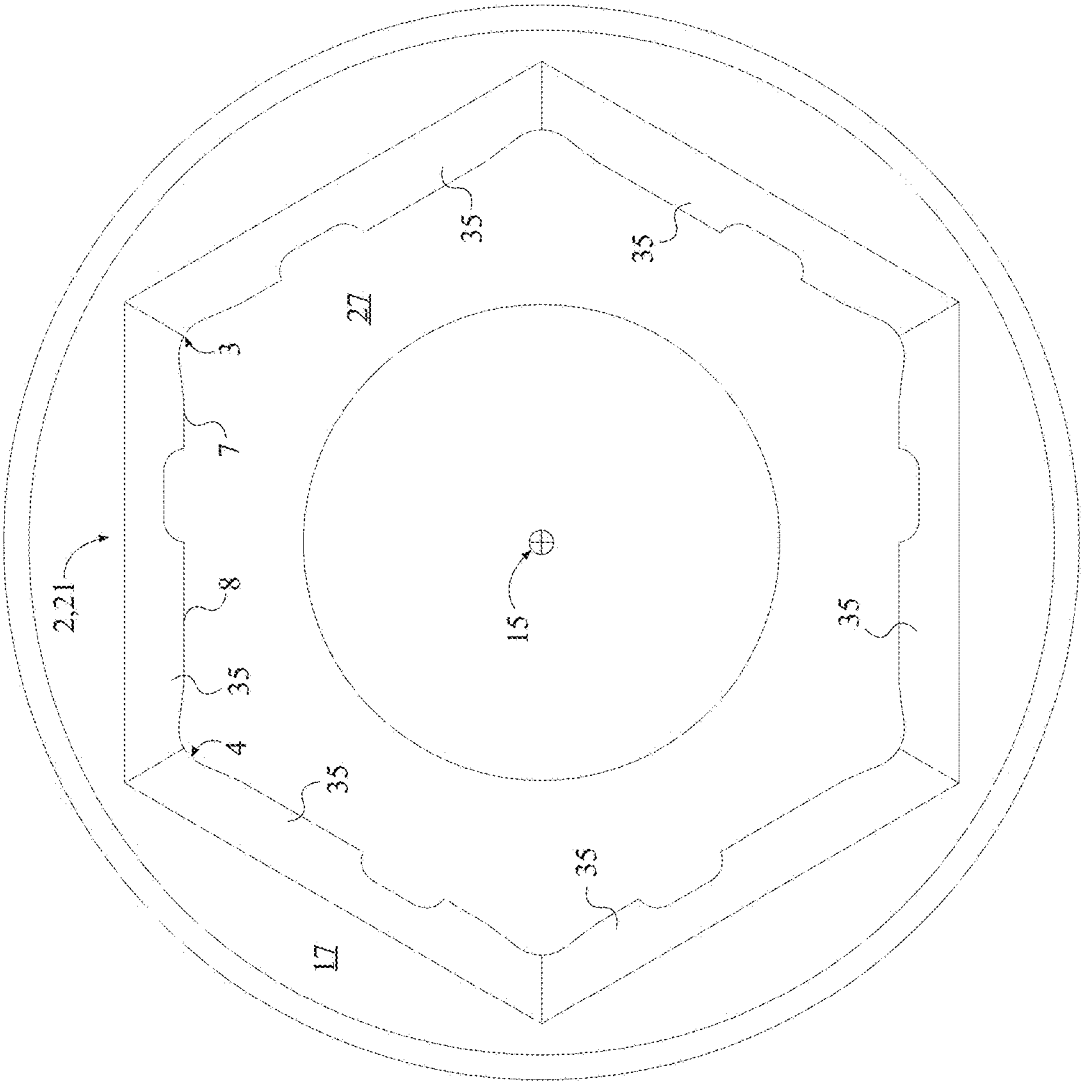
FIG. 18 is a top view of the alternative embodiment in FIG. 17.

In reference to some embodiments of the present invention, as shown in FIGS. 17-18, the present invention further comprises a base surface 17 and a chamfered surface 18. The base surface 17 is disposed on the engagement first base 13. The chamfered surface 18 comprises a plurality of angular portions 35. The plurality of angular portions 35 is radially positioned within the base surface 17 and oriented towards the engagement second base 14. Furthermore, each of the plurality of angular portions 35 is centrally positioned to the specific sidewall 21 from the plurality of internal sidewalls 2 so that each of the plurality of engagement elements 16 is able to efficiently engage with the fastener. More specifically, the chamfered surface 18 preferably comprises six angular portions 35, but may comprise of any number of angular portions. The plurality of angular portions 35 of the chamfered surface 18 can also be formed into a hexagonal shape. This indexing chamfer greatly benefits the end user when placing the torque-tool body 1 on a hexagonal fastener to locate the corners of the hexagonal fastener with the correct location on the six angular portions 35 of the chamfered surface 18 of the torque-tool body 1, and thus placing each of the plurality of engagement elements 16 in the correct location on the fastener to achieve the most efficient engagement. It is also understood that the even though the engagement element 16 of the present invention preferably incorporates a smaller first tooth 7 and larger second tooth 8, the present invention is not limited to this embodiment, the present invention includes designs where only a single first tooth 7 or a single second tooth 8 are incorporated into the engagement element 16. In one embodiment of a single first tooth 7 configuration, the distance from the second lateral edge 4 to a first end 73 of the first tooth 7 is equal to, less than, or greater than a distance from the first lateral edge 3 to the first end 73 of the first tooth 7. Similarly, in one embodiment of a single second tooth 8 configuration, the distance from the second lateral edge 4 to a first end 83 of the second tooth 8 is equal to, less than, or greater than a distance from the first lateral edge 3 to the first end 83 of the second tooth 8. By adjusting the distance of the first end 83 of the second tooth 8 and the first end 73 of the first tooth 7, engagement with the fastener may be changed to optimize the torque force and torque position on the fastener sidewall.

In one embodiment, as shown in FIG. 4, a perpendicular distance 36 from the sidewall base surface 5 to the second end 74 of the first tooth 7 is less than a perpendicular distance 37 from the sidewall base surface 5 to the first end 73 of the first tooth. In another embodiment, the perpendicular distance 36 from the sidewall base surface 5 to the second end 74 of the first tooth 7 is equal to the perpendicular distance 37 from the sidewall base surface 5 to the first end 73 of the first tooth.

Similarly in one embodiment, as shown in FIG. 4, a perpendicular distance 36 from the sidewall base surface 5 to the second end 84 of the second tooth 8 is less than a perpendicular distance 37 from the sidewall base surface 5 to the first end 83 of the second tooth. In another embodiment, the perpendicular distance 36 from the sidewall base surface 5 to the second end 84 of the second tooth 8 is equal to the perpendicular distance 37 from the sidewall base surface 5 to the first end 83 of the second tooth.

In another embodiment, as shown in FIG. 4, the first base 71 of the first tooth 7 and the first base 81 of the second tooth 8 may be on different levels/planes in relation to the sidewall base surface 5. In particular, a perpendicular distance 36 from the sidewall base surface 5 to the second end 74 of the first tooth 7 may be less than or greater than a perpendicular distance 36 from the sidewall base surface 5 to the second end 84 of the second tooth 8. Similarly, a perpendicular distance 37 from the sidewall base surface 5 to the first end 73 of the first tooth 7 may be less than or greater than a perpendicular distance 37 from the sidewall base surface 5 to the first end 83 of the second tooth 8. By adjusting the first base 81 of the second tooth 8 and the first base 71 of the first tooth 7 to be on different planes, engagement with the fastener may be changed to optimize the torque force and torque position on the fastener sidewall.

It is understood the present invention is not limited to having both a first tooth 7 and a second tooth 8. In other embodiments, the present invention may have only one tooth selected from the group consisting of: a first tooth 7 and a second tooth 8.

It is understood that a male version encompassing all of the aforesaid components and descriptions of the present invention is included as alternative embodiments of the present application.

Although the invention has been explained in relation to its preferred embodiment, it is to be understood that many other possible modifications and variations can be made without departing from the spirit and scope of the invention as hereinafter claimed.

What is claimed is:

1. An anti-slip wrench-type tool comprising:

a wrench torque-tool body;

an at least one engagement element;

the wrench torque-tool body comprising a plurality of internal sidewalls, an engagement first base, and an engagement second base;

each of the plurality of internal sidewalls comprising a sidewall first lateral edge, a sidewall second lateral edge, and a sidewall base surface;

the plurality of internal sidewalls being radially distributed about a pivot axis of the wrench torque-tool body;

the at least one engagement element being laterally integrated into a specific sidewall from the plurality of internal sidewalls;

the at least one engagement element comprising a first tooth and a second tooth;

the first tooth and the second tooth being positioned offset from each other along the sidewall base surface of the specific sidewall;

the first tooth being positioned adjacent to the sidewall first lateral edge;

the second tooth being positioned between the first tooth and the sidewall second lateral edge;

the first tooth and the second tooth each extending from the engagement first base to the engagement second base;

the first tooth and the second tooth each comprising a first base, a first base surface, and a second base;

the second base of the first tooth and the second base of the second tooth each being terminally connected to the sidewall base surface;

the first tooth extending from the second base to the first base of the first tooth;

the second tooth extending from the second base to the first base of the second tooth;

the first tooth and the second tooth each further comprising a first end, a second end, a first lateral side surface, and a second lateral side surface;

the first end and the second end of the first tooth being oppositely positioned of each other about the first base of the first tooth;

the first lateral side surface of the first tooth extending from the first end to a first lateral edge of the first tooth;

the second lateral side surface of the first tooth extending from the second end to a second lateral edge of the first tooth;

the first end and the second end of the second tooth being oppositely positioned of each other about the first base of the second tooth;

the first lateral side surface of the second tooth extending from the first end to a first lateral edge of the second tooth;

the second lateral side surface of the second tooth extending from the second end to a second lateral edge of the second tooth;

the first lateral side surface of the first tooth being oriented to face the first lateral side surface of the second tooth; and a distance measured from the sidewall second lateral edge adjacent to the second tooth to the first end of the second tooth is greater than a distance measured from the sidewall first lateral edge adjacent to the first tooth to the first end of the first tooth.

2. The anti-slip wrench-type tool as claimed in claim 1 comprising:

an attachment body;

an engagement bore;

the attachment body being centrally positioned around and along the pivot axis;

the attachment body being connected adjacent to the engagement second base; and the engagement bore traversing into the attachment body along the pivot axis, opposite the wrench torque-tool body.

3. The anti-slip wrench-type tool as claimed in claim 1 comprising:

an attachment body;

the attachment body being centrally positioned around and along the pivot axis; and the attachment body being adjacently connected to the engagement second base.

4. The anti-slip wrench-type tool as claimed in claim 1 comprising:

a wrench handle; and the wrench handle being externally and laterally connected to the wrench torque-tool body.

5. The anti-slip wrench-type tool as claimed in claim 4 comprising:

a fastener-receiving opening;

the fastener-receiving opening traversing through the wrench torque-tool body, perpendicular to the pivot axis;

the fastener-receiving opening being positioned opposite the wrench handle, across the wrench torque-tool body; and the fastener-receiving opening being oriented parallel to the specific sidewall.

6. The anti-slip wrench-type tool as claimed in claim 1 comprising:

the first tooth having a first tooth width;

the second tooth having a second tooth width;

the first tooth width being less than the second tooth width; and the first tooth and the second tooth being spaced apart by a tooth gap.

7. The anti-slip wrench-type tool as claimed in claim 1 comprising:

the plurality of internal sidewalls comprising an opposing sidewall;

the opposing sidewall being positioned opposite to the specific sidewall, across the wrench torque-tool body;

the second tooth on the specific sidewall being opposingly aligned with the second tooth on the opposing sidewall; and the first tooth on the specific sidewall being positioned diagonally opposing the second tooth on an opposing sidewall.

8. The anti-slip wrench-type tool as claimed in claim 7 comprising:

the plurality of internal sidewalls comprising an intermediate sidewall;

the intermediate sidewall being perpendicularly positioned in between the specific sidewall and the opposing sidewall;

an entire cross-section of the intermediate sidewall being a partially-circular profile; and the partially-circular profile being concave along a direction from the first lateral edge to the second lateral edge of the intermediate sidewall.

9. The anti-slip wrench-type tool as claimed in claim 8, wherein an intermediate sidewall may have an at least one tooth.

10. The anti-slip wrench-type tool as claimed in claim 7, wherein the base surface of the first tooth of the specific sidewall is not parallel with the base surface of the first tooth of the opposing sidewall.

11. The anti-slip wrench-type tool as claimed in claim 7, wherein the base surface of the second tooth of the specific sidewall is parallel with the base surface of the second tooth of the opposing sidewall.

12. The anti-slip wrench-type tool as claimed in claim 1 comprising:

the plurality of internal sidewalls comprising an arbitrary sidewall and an adjacent sidewall;

the arbitrary sidewall adjacently adjoining to the adjacent sidewall by a curved corner;

the first tooth on the arbitrary sidewall being positioned adjacent to the first tooth on the adjacent sidewall, offset by a predefined distance; and the second tooth on the arbitrary sidewall being positioned adjacent to the second tooth on the adjacent sidewall, offset by a predefined distance.

13. The anti-slip wrench-type tool as claimed in claim 1 comprising:

the plurality of internal sidewalls comprising an opposing sidewall;

the opposing sidewall being positioned opposite to the specific sidewall, across the wrench torque-tool body;

the first end of the second tooth on the specific sidewall being aligned with the first end of the second tooth on the opposing sidewall; and the second end of the first tooth on the specific sidewall being axial-diagonally oriented with the second end of the second tooth on the opposing sidewall.

14. The anti-slip wrench-type tool as claimed in claim 13, wherein a through line from the first end of the second tooth on the specific sidewall connected to the first end of the second tooth on the opposing sidewall being aligned with the pivot axis.

15. The anti-slip wrench-type tool as claimed in claim 13, wherein a through line from the first end of the second tooth on the specific sidewall connected to the first end of the second tooth on the opposing sidewall being not aligned and offset with the pivot axis.

16. The anti-slip wrench-type tool as claimed in claim 1 comprising:

each of the first lateral side surface and the second lateral side surface of the first tooth extending outward at an obtuse angle with the first base of the first tooth; and each of the first lateral side surface and the second lateral side surface of the second tooth extending outward at an obtuse angle with the first base of the second tooth.

17. The anti-slip wrench-type tool as claimed in claim 1 comprising:

an entire cross-section of each the first lateral side surface and the second lateral side surface of the first tooth being a concave profile; and an entire cross-section of each the first lateral side surface and the second lateral side surface of the second tooth being a concave profile.

18. The anti-slip wrench-type tool as claimed in claim 1 comprising:

a distance from the pivot axis to the first end of the second tooth being less than a distance from the pivot axis to the first end of the first tooth.

19. The anti-slip wrench-type tool as claimed in claim 1, wherein the first base surface of the first tooth is colinear with the first base surface of the second tooth.

20. The anti-slip wrench-type tool as claimed in claim 1, wherein the first base surface of the first tooth is not colinear with the first base surface of the second tooth.

21. The anti-slip wrench-type tool as claimed in claim 1 comprising:

the first tooth being smaller than the second tooth; and a first tooth width being less than a second tooth width.

22. The anti-slip wrench-type tool as claimed in claim 1 comprising:

the at least one engagement element being a plurality of engagement elements;

the plurality of engagement elements being radially distributed about the pivot axis; and each of the plurality of engagement elements being laterally integrated into a corresponding sidewall from the plurality of internal sidewalls.

23. The anti-slip wrench-type tool as claimed in claim 1, wherein a perpendicular distance from the sidewall base surface to the second end of the first tooth is less than a perpendicular distance from the sidewall base surface to the first end of the first tooth.

24. The anti-slip wrench-type tool as claimed in claim 1, wherein a perpendicular distance from the sidewall base surface to the second end of the first tooth is equal to a perpendicular distance from the sidewall base surface to the first end of the first tooth.

25. The anti-slip wrench-type tool as claimed in claim 1, wherein a perpendicular distance from the sidewall base surface to the second end of the second tooth is less than a perpendicular distance from the sidewall base surface to the first end of the second tooth.

26. The anti-slip wrench-type tool as claimed in claim 1, wherein a perpendicular distance from the sidewall base surface to the second end of the second tooth is equal to a perpendicular distance from the sidewall base surface to the first end of the second tooth.

27. The anti-slip wrench-type tool as claimed in claim 1, wherein a length of the second lateral side surface of the second tooth is greater than a length of the second lateral side surface of the first tooth.

28. The anti-slip wrench-type tool as claimed in claim 1, wherein a distance between the second end of the first tooth and the sidewall base surface is less than a distance from the second end of the second tooth and the sidewall base surface.

* * * * *